United States Patent
Saito

(10) Patent No.: US 6,404,744 B1
(45) Date of Patent: Jun. 11, 2002

(54) METHOD FOR DESIGNING A COMMUNICATION NETWORK

(75) Inventor: Hiroyuki Saito, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/235,733

(22) Filed: Jan. 22, 1999

(51) Int. Cl.⁷ .............................................. H04L 12/28
(52) U.S. Cl. ...................... 370/255; 370/257; 370/351; 709/220
(58) Field of Search ................................ 370/254, 255, 370/468, 257, 258, 352, 353, 354, 355, 356, 400, 401, 464, 465, 546, 901, 908, 912, 351; 703/1, 2; 716/1, 12, 14; 709/220; 345/733, 734, 735

(56) References Cited

U.S. PATENT DOCUMENTS

| | | | |
|---|---|---|---|
| 5,508,999 A | * 4/1996 | Cox, Jr. et al. | 370/252 |
| 5,831,610 A | * 11/1998 | Tonelli et al. | 345/735 |
| 6,141,318 A | * 10/2000 | Miyao | 370/217 |
| 6,185,193 B1 | * 2/2001 | Kawakami et al. | 370/254 |
| 6,223,220 B1 | * 4/2001 | Blackwell et al. | 709/223 |
| 6,330,005 B1 | * 12/2001 | Tonelli et al. | 345/735 |

OTHER PUBLICATIONS

"Restoration Strategies and Spare Capacity Requirements in Self–Healing ATM Networks", by Yijun Xiong, et al., Infocom '97, Apr. 1997.

* cited by examiner

Primary Examiner—Ricky Ngo
Assistant Examiner—Phuc Tran
(74) Attorney, Agent, or Firm—Scully, Scott, Murphy & Presser

(57) ABSTRACT

A method for designing a communication network that can cope with variations in demand pattern is disclosed. Stochastic constraints are generated by using the requested capacity of a demand to produce a stochastic programming problem. Then the stochastic programming problem is converted into an equivalent determinate programming problem on condition of the predetermined probability distribution. The determinate programming problem is solved to determine capacities of the nodes and the links so that the objective function is minimized. This brings about an effect that traffics can be accommodated even if a demand pattern changes to some degree.

45 Claims, 9 Drawing Sheets

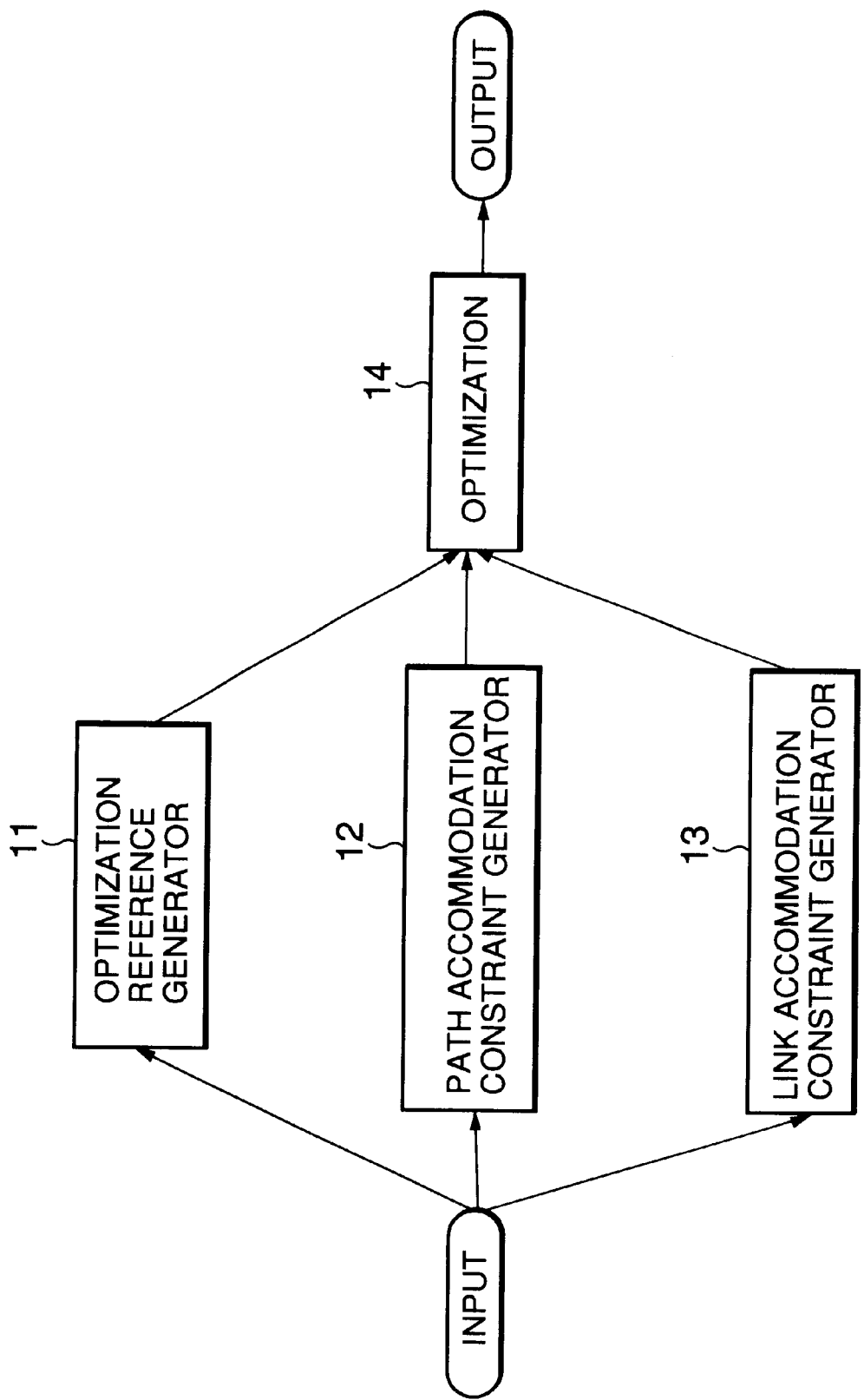

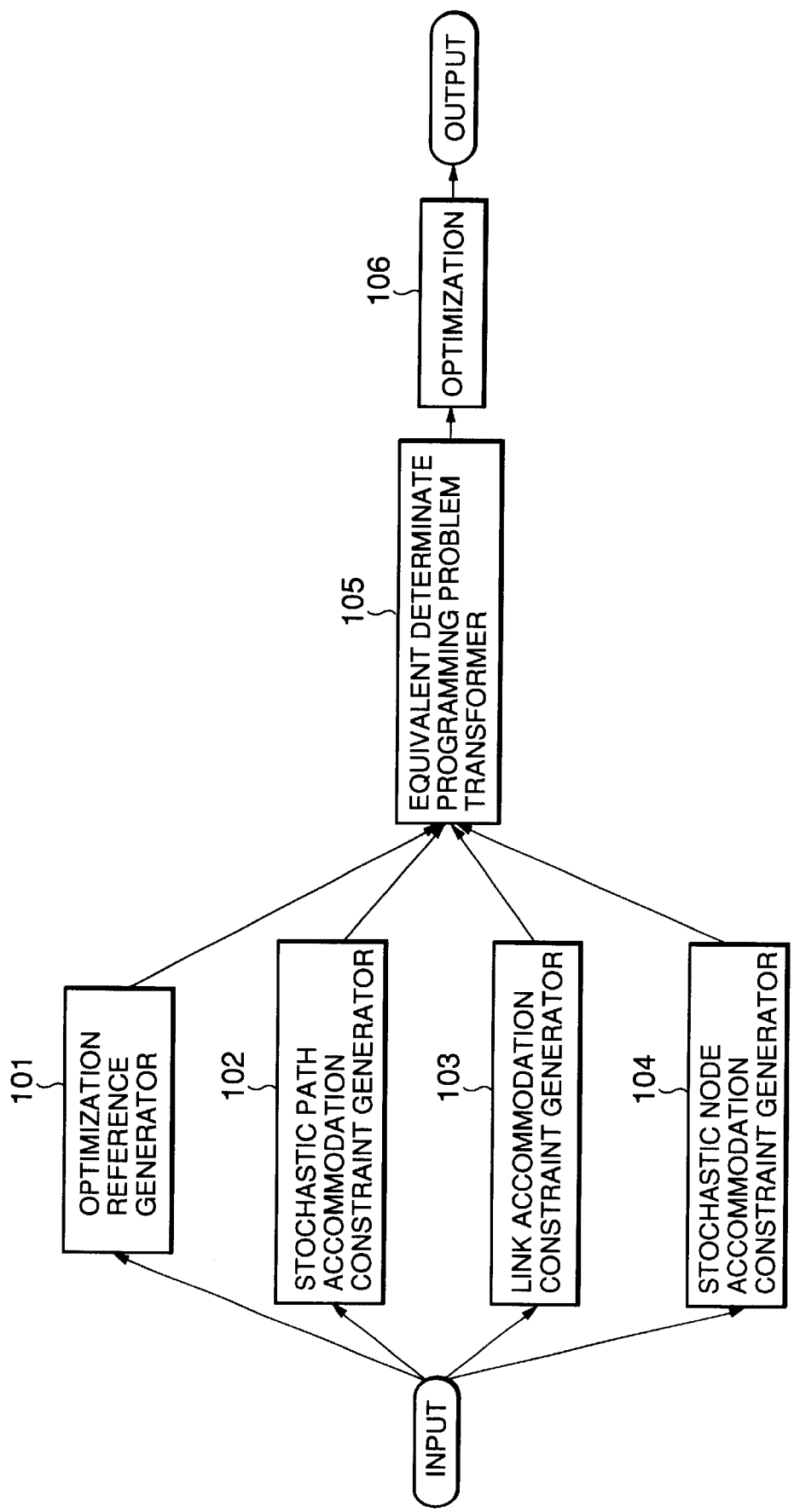

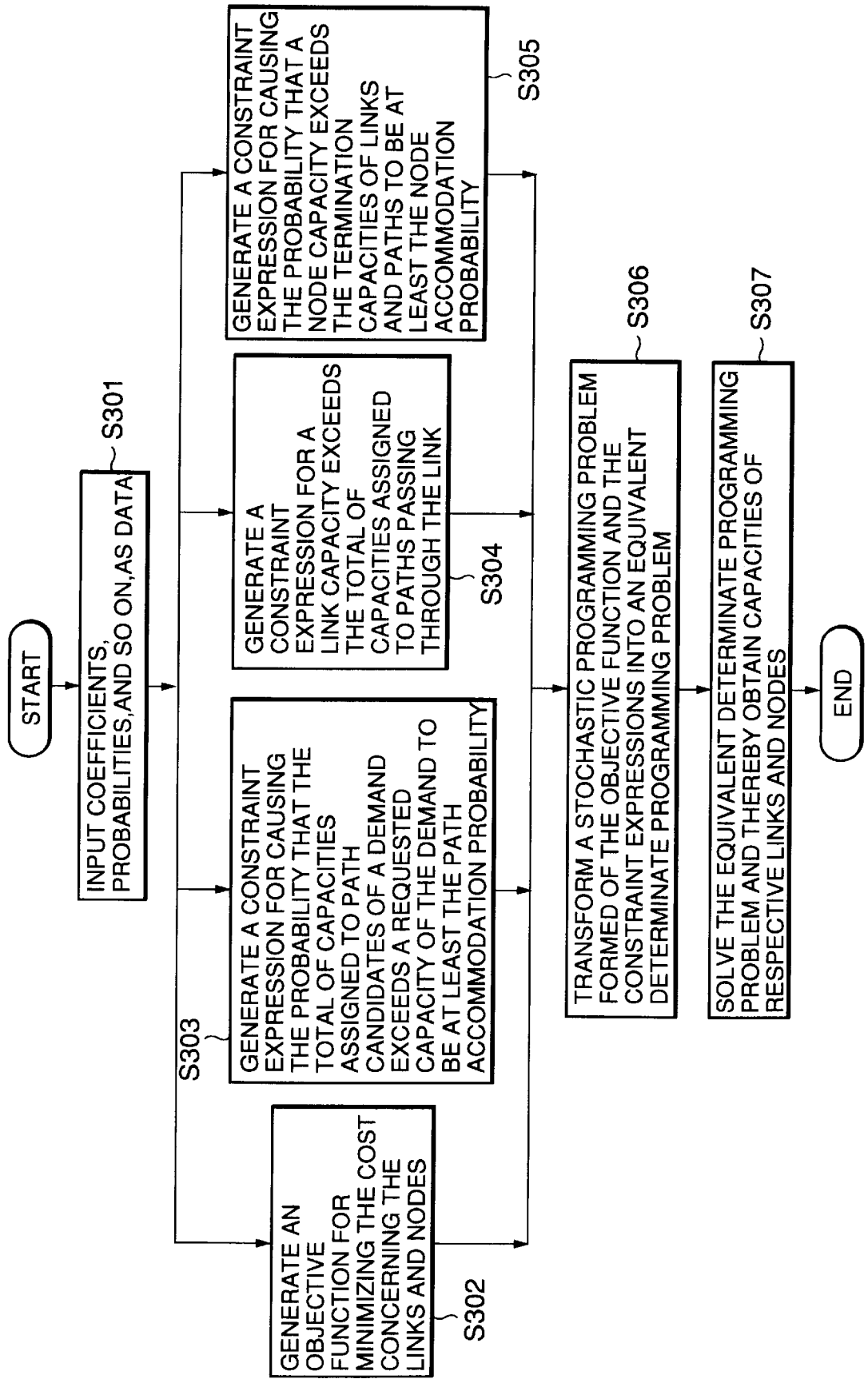

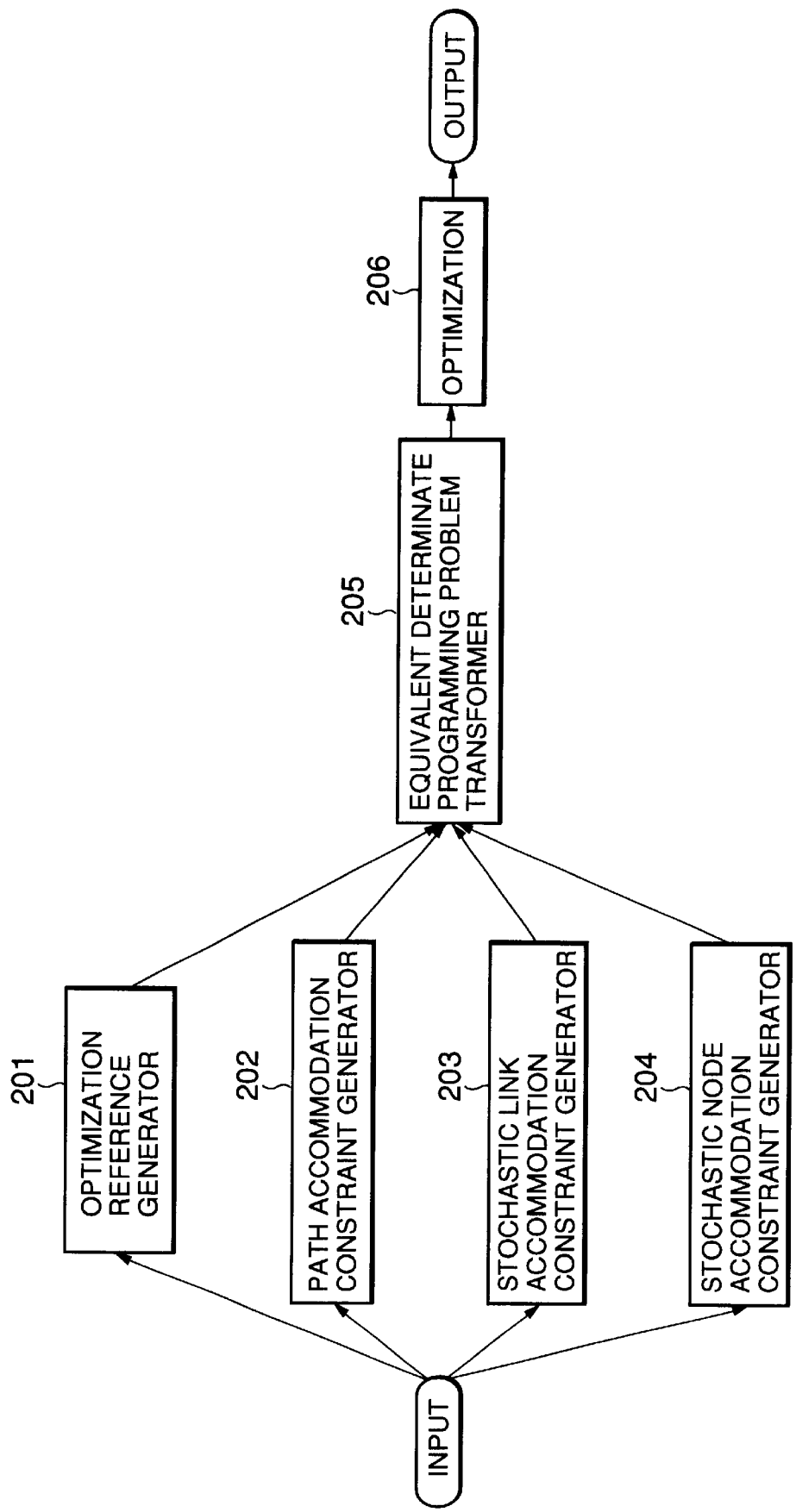

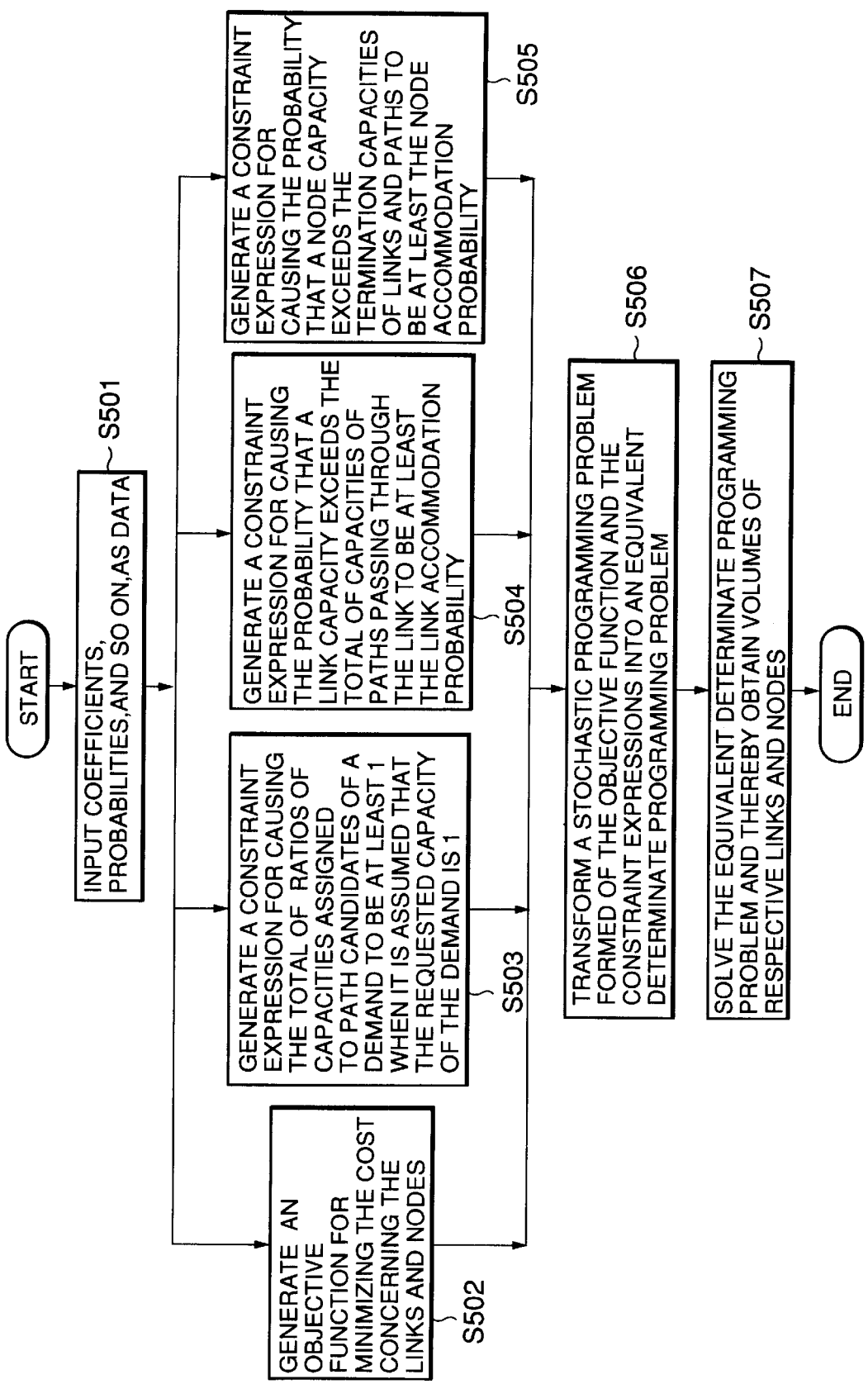

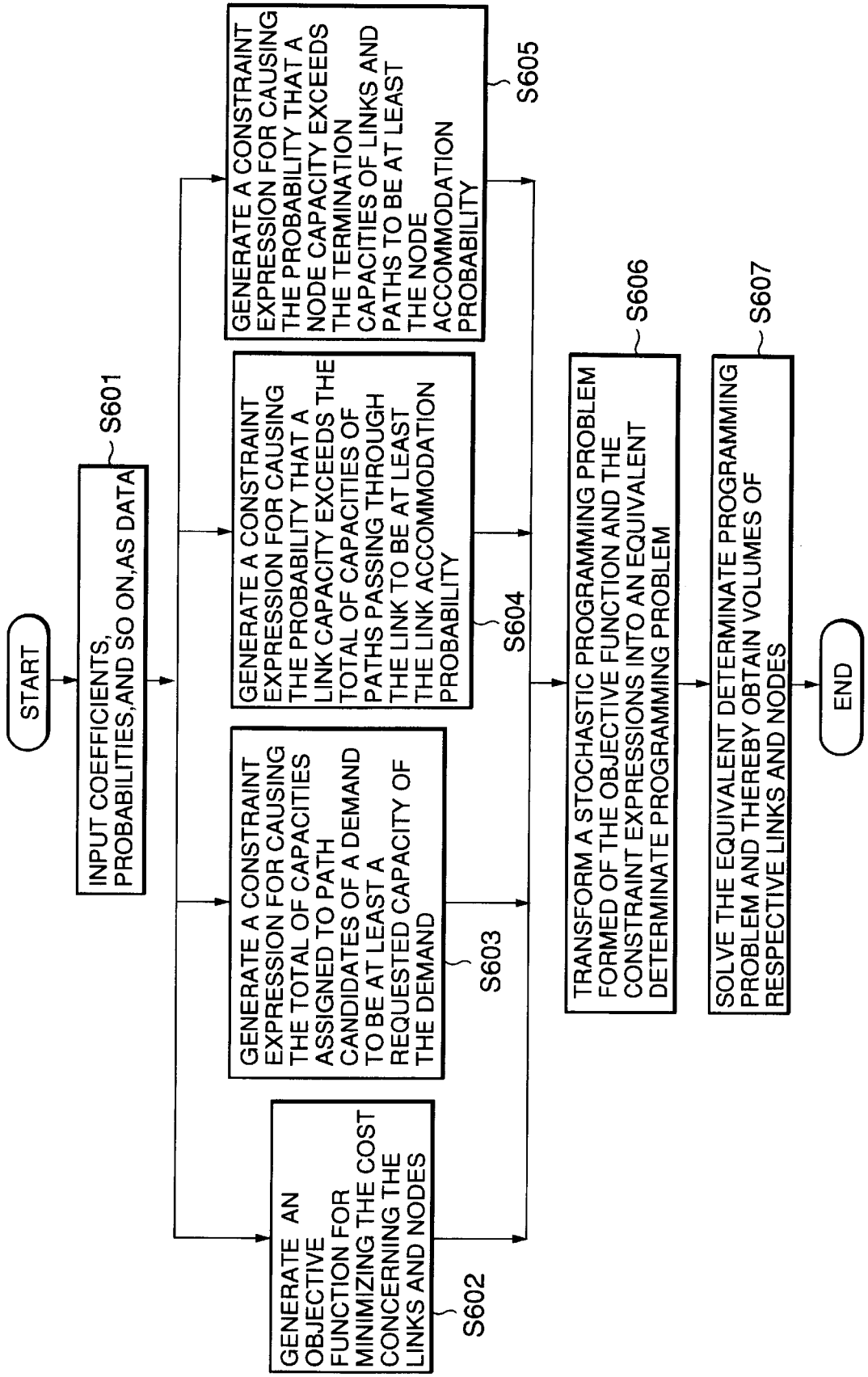

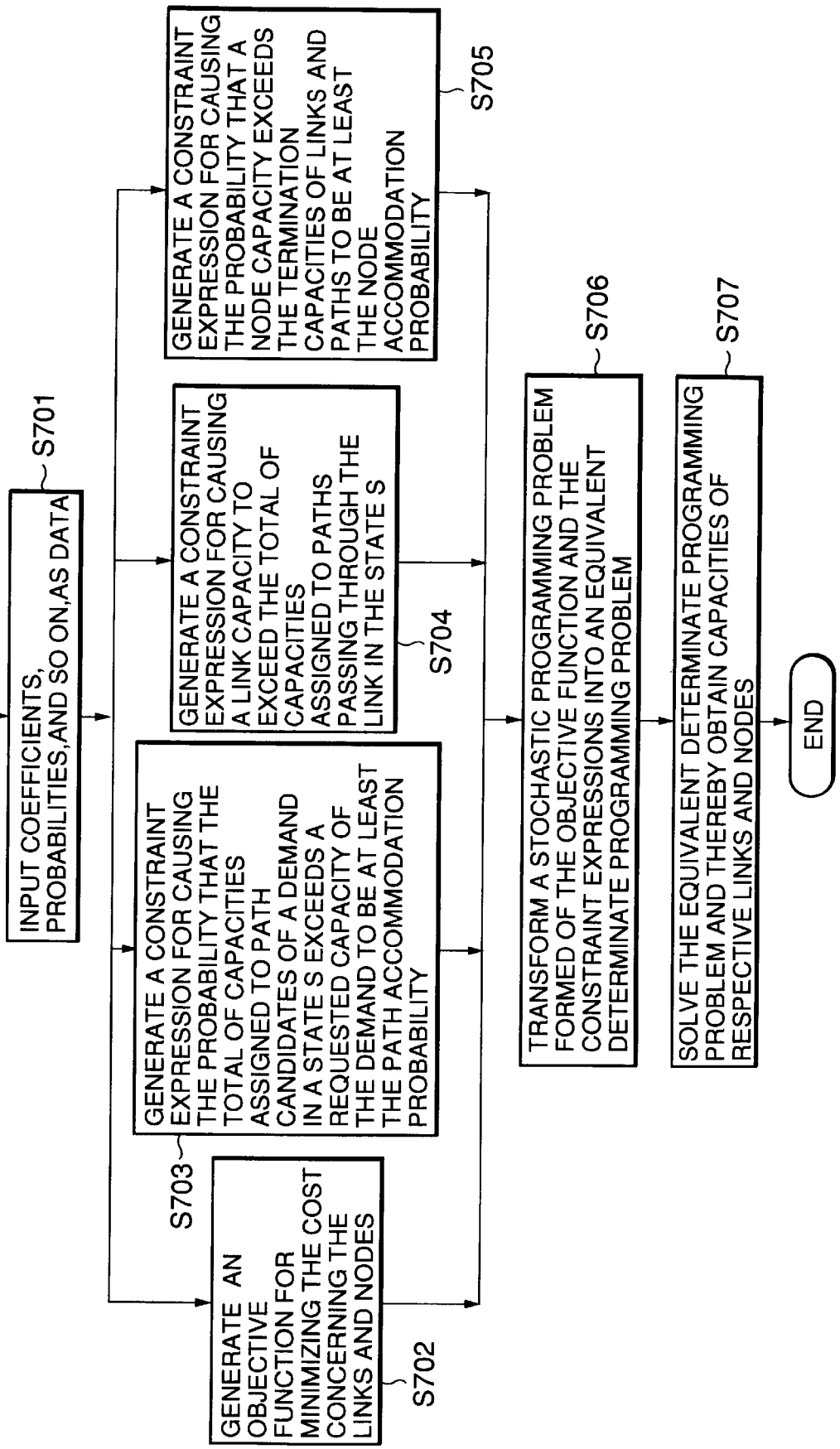

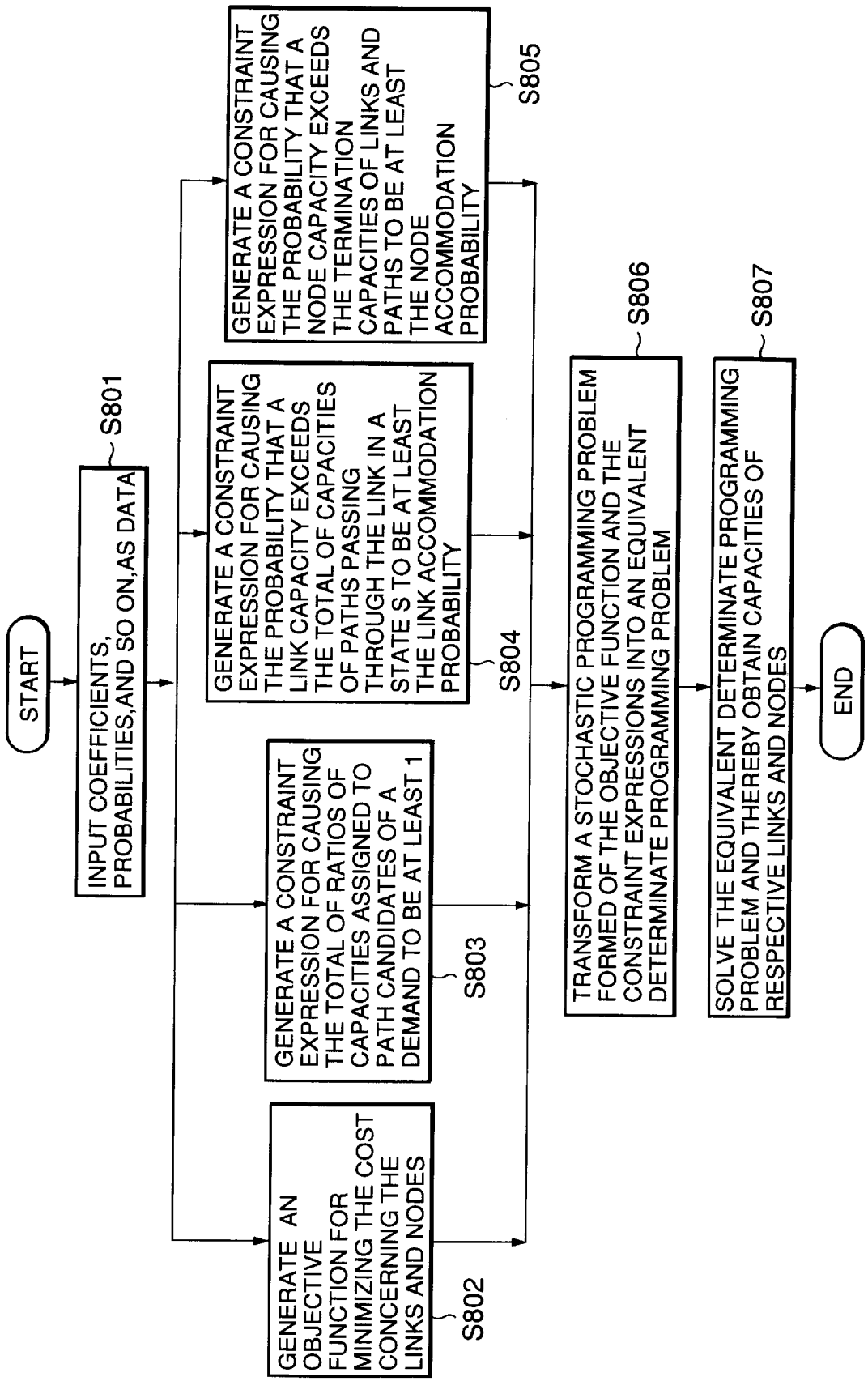

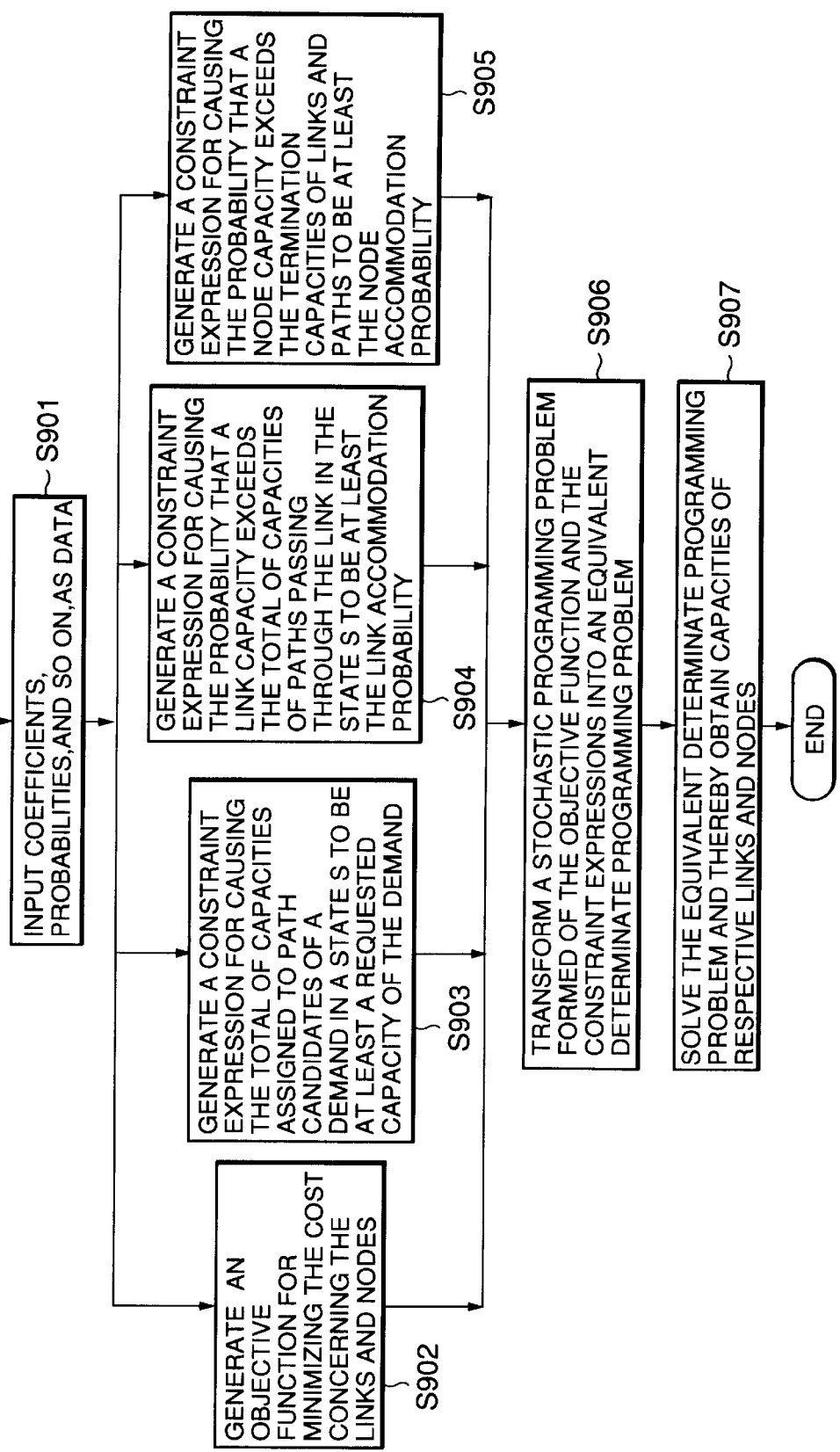

METHOD FOR DESIGNING A COMMUNICATION NETWORK

BACKGROUND OF THE INVENTION

1. Field of the Invention

The present invention relates to communication network design techniques, and in particular to a method for designing a communication network to cope with demand variations and network faults.

2. Description of Related Art

As for a communication network design method conventionally used to cope with demand variations and network faults, there has been proposed a method of designing path and link capacities for a given specific demand by using linear programming. For example, "Restoration Strategies and Spare Capacity Requirements in Self-Healing ATM Networks," has been proposed by Yijun Xiong and Lorne Mason (INFOCOM '97, April 1997). Here, the linear programming refers to a method for handling a problem of finding a maximal or minimal value of a linear objective function under. conditions of linear equalities and inequalities In a conventional communication network design method, paths of respective demands for respective fault states are set so that the communication may be maintained even at the time of conceivable link fault, and the link capacity is designed to be able to accommodate those paths at the time of the link fault.

As shown in FIG. 1, as input date, a network topology, a demand, a link cost coefficient, and conceivable fault states are given. Providing with the input data, an optimization reference generator 11 generates an objective function for minimizing the cost concerning the link. A path accommodation condition generator 12 generates a constraint formula representing that the sum of capacities assigned to path candidates is equal to the requested capacity of the demand.

A link accommodation condition generator 13 generates a constraint formula representing that the capacity of that link is larger than the total of capacities of paths passing through each link in each state. In succession, an optimization section 14 solves a linear programming problem generated by the optimization reference generator 11, the path accommodation generator 12, and the link accommodation condition generator 13 to determine the capacities of the paths and links. In general, a linear programming problem refers to a problem of maximizing or minimizing an objective function represented by a linear equation under a constraint condition represented by some linear equalities or inequalities.

In the above described conventional communication network design method, there is developed a problem that an optimum design is conducted only for a given determinate demand pattern, where "demand pattern" refers to a set of demands requested between all nodes.

For a given determinate demand pattern, optimization is conducted by using mathematical programming. Therefore, after ensuring that the demand pattern can be accommodated, an optimum network minimizing the cost is designed. In other words, there is no assurance for a pattern different from that demand pattern.

In actual communication networks, however, the demand pattern differs depending upon time zone, day of a week, season, and so on, and is varied by events and the like. Even if the season, the day of week, and the time zone are the same, it is hardly to be supposed that completely the same demand pattern is brought about. Furthermore, it is also possible that the demand pattern significantly changes according to the wide spread of new communication service or introduction of a new technique.

In the conventional network centering on the existing telephone network, forecast of the demand was possible to some degree. In multimedia networks of recent.years, however, demand forecast has become very difficult.

SUMMARY OF THE INVENTION

An object of the present invention is to solve the above described problems, and to provide a communication network design method that is capable of accommodating traffic varying due to variations in demand pattern.

According to the present invention, a communication network composed of a plurality of nodes and links each connecting two nodes is designed by the following steps: a) inputting network data including a requested capacity of a demand as a random variable following a predetermined probability distribution between any two nodes and path candidates of the demand for accommodating the requested capacity of the demand; b) generating an objective function representing a total cost of the nodes and the links from the network data; c) generating a predetermined set of stochastic constraints by using the requested capacity of the demand to produce a stochastic programming problem including the objective function and the stochastic constraints; d) converting the stochastic programming problem into an equivalent determinate programming problem on condition of the predetermined probability distribution; and e) solving the determinate programming problem to determine capacities of the nodes and the links so that the objective function is minimized.

The step c) may include the steps of: c-1) generating a stochastic path accommodation constraint for causing the requested capacity of the demand to be accommodated in the path candidates; c-2) generating a link accommodation constraint for causing capacities assigned to path candidates to be accommodated in the links; and c-3) generating a stochastic node accommodation constraint for causing a total of capacities of path candidates passing through a node to be accommodated in the node.

The step c) may include the steps of: c-1) generating a path accommodation constraint for causing the requested capacity of the demand to be accommodated in the path candidates; c-2) generating a stochastic link accommodation constraint for causing capacities assigned to path candidates to be accommodated in the links; and c-3) generating a stochastic node accommodation constraint for causing a total of capacities of path candidates passing through a node to be accommodated in the node.

According to the present invention, the stochastic constraints are generated by using the requested capacity of the demand to produce a stochastic programming problem and then the stochastic programming problem is converted into an equivalent determinate programming problem on condition of the predetermined probability distribution. The determinate programming problem is solved to determine capacities of the nodes and the links so that the objective function is minimized. This brings about an effect that traffics can be accommodated even if a demand pattern changes to some degree. In other words, the stochastic programming problem regarding the paths, the links and the nodes is generated and then the equivalent determinate programming problem is determined. Therefore, traffics can be accommodated even if a demand pattern changes to some degree, resulting in reduced cost for network construction.

BRIEF DESCRIPTION OF THE DRAWINGS

FIG. 1 is a block diagram showing the configuration of a conventional communication network design circuit;

FIG. 2 is a block diagram showing the configuration of a communication network design system for implementing a first embodiment of a network design method according to the present invention;

FIG. 3 is a flow chart showing a network design method according to the first embodiment of the present invention;

FIG. 4 is a block diagram showing the configuration of a communication network design system for implementing the following embodiments of a network design method according to the present invention;

FIG. 5 is a flow chart showing a network design method according to a second embodiment of the present invention;

FIG. 6 is a flow chart showing a network design method according to a third embodiment of the present invention;

FIG. 7 is a flow chart showing a network design method according to a fourth embodiment of the present invention;

FIG. 8 is a flow chart showing a network design method according to a fifth embodiment of the present invention; and FIG. 9 is a flow chart showing a network design method according to a sixth embodiment of the present invention.

DESCRIPTION OF THE PREFERRED EMBODIMENTS

First of all, symbols to be used in first to third embodiments according to the present invention will be described hereinafter.

l: a link number in the range of 1, . . . , L.

n: a node number in the range of 1, . . . , N.

p: a demand number in the range of 1, . . . , P.

$i_p$: a candidate number of a demand p in the range of 1, . . . , $I_p$, where a path candidate $i_p$ of a demand p is an arbitrary path between an originating node and a terminating node of a demand p.

$\omega_l$: a cost coefficient of a link l.

$\epsilon$: a cost coefficient of a node.

$g_{ip/l}$: an indicator indicating 1 when a path $1_p$ of a demand p passes through a link l (as represented by ip/l) and indicating 0 otherwise.

$h_{l/n}$: an indicator indicating 1 when a link l passes though node n (as represented by l/n) and indicating 0 otherwise.

$o_{p/n}$: an indicator indicating 1 when a demand p terminates at a node n (as represented by p/n) and indicating 0 otherwise.

$\lambda$: the capacity of a unit of link. For example, in a light-wave network, $\lambda$ represents the number of wavelength paths accommodated in one optical fiber.

$\nu$: the capacity of a unit of node. For example, in a light-wave network, $\nu$ represents the number of wavelength paths accommodated in one optical cross-connect.

$v_p$: requested capacity (random variable) of a demand p.

$\alpha$: a probability (path accommodation probability) that the requested capacity $v_p$ of a demand p is assigned to path candidates of the demand p.

$\beta$: a probability (link accommodation probability) that the total of capacities of paths $i_p$ passing through a link l can be accommodated in the link l.

$\gamma$: a probability (node accommodation probability) that the total of capacities of links terminating at a node n and capacities of paths $i_p$ terminating at the node n can be accommodated in the node n.

$c_{ip}$: a capacity (integer variable) assigned to a path candidate $i_p$ of a demand p.

$r_{ip}$: a ratio (real number variable) assigned to a path candidate $i_p$ when it is assumed that a requested capacity of a demand p is 1.

$d_l$: a capacity (integer variable) assigned to a link l.

$e_n$: a capacity (integer variable) assigned to a node n.

First Embodiment

Referring to FIG. 2, the communication network design system implements a first embodiment of the present invention with hardware or software. In the preferred embodiment, a network design procedure according to the first embodiment is implemented by a computer running a network design program thereon. The network design program according to the first embodiment is previously stored in a read-only memory (ROM), a magnetic storage, or the like (not shown).

Necessary input data is supplied to an optimization reference generator 101, a stochastic path accommodation constraint generator 102, a link accommodation constraint generator 103, and a stochastic node constraint generator 104. The optimization reference generator 101 produces an objective function and the other generators 102–104 produce stochastic constraints to produce a stochastic programming problem. The stochastic programming problem is transformed to an equivalent determinate programming problem by an equivalent determinate programming problem transformer 105. An optimization section 106 optimizes the objective function under the equivalent determinate programming problem to produce an optimized network design as an output. The details of network design procedure according to the first embodiment will be described hereinafter.

Referring to FIG. 3, the system is first provided with a network topology, demands each having a requested capacity given by probability distribution, path candidates of respective demands, cost coefficients of link/nodes, path accommodation probabilities, and node accommodation probabilities (step S301).

On the basis of the above input data, the optimization reference generator 101 generates an objective function represented by the following expression (step S302).

$$\text{Minimize}\left[\sum_{l=1}^{L} \omega_l d + \varepsilon \sum_{n=1}^{N} e_n \right] \quad (1)$$

The expression (1) means minimization of the cost concerning the links and the cost concerning the nodes.

The stochastic path accommodation condition generator 102 generates the following constraint expression for paths to accommodate the requested capacity of a demand (step S302).

$$\text{Prob}\left[\sum_{i_p=1}^{I_p} c_{ip} \geq v_p \right] \geq \alpha \quad (p=1, \cdots, P) \quad (2)$$

where, Prob [ ] represents the probability that the condition in [ ] is satisfied. The expression (2) represents the accommodation condition of the path, and means that the probability that the total of capacities assigned to path candidates $i_p$ of a demand p exceeds a requested capacity $v_p$ of the demand p is at least $\alpha$.

The link accommodation condition generator 103 generates the following constraint expression for a link to accommodate capacities assigned to paths (step S303).

$$\sum_{p=1}^{P} \sum_{i_p=1}^{l_p} g_{ip/1} c_{ip} \leq \lambda d_1 \quad (1 = 1, \cdots, L) \tag{3}$$

The expression (3) means that the capacity $d_l$ of a link l exceeds the total of capacities of paths $i_p$ passing through the link l.

The stochastic node accommodation condition generator 104 generates the following constraint expression for a node to accommodate the capacities assigned to paths (step S304).

$$\text{Prob}\left[\sum_{i=1}^{L} h_{l/n} d_l + \sum_{p=1}^{P} o_{p/n} v_p / \lambda \leq v e_n \right] \geq \gamma \quad (n = 1, \cdots, N) \tag{4}$$

$(n=1, \ldots, N)$ \hfill (4)

The expression (4) means that the probability that the capacity of a node n exceeds the termination capacities of the links l and the termination capacities of the demands p is at least $\gamma$.

The expression (1) of the objective function and the constraint expressions (2), (3) and (4) respectively generated by the optimization reference generator 101, the stochastic path accommodation constraint generator 102, the link accommodation constraint generator 103, and the stochastic node accommodation constraint generator 104 form a stochastic programming problem.

The equivalent determinate programming problem transformer 105 transforms the stochastic programming problem into an equivalent determinate programming problem (step 305). If it is assumed that the requested capacity $v_p$ follows a normal distribution having a mean $\mu_p$ and a variance $\sigma_p$, the expression (2) can be transformed as follows:

$$\sum_{i_p=1}^{l_p} c_{ip} \geq \mu_p + t(\alpha)\sigma_p \quad (p = 1, \cdots, P) \tag{5}$$

where $t(\alpha)$ is a safety coefficient of a standard normal distribution satisfying $\alpha$.

In succession, the equivalent determinate programming problem transformer 105 transforms the expression (4). If it is assumed that the sum total of $o_{p/n} v_p$ for p=1, ..., P follows a normal distribution having a mean $\mu_n$ and a variance $\sigma_p$, the mean $\mu_n$ and the variance $\sigma_n$ are derived by the following expressions (6) and (7), because the requested capacities $v_p$ respectively have independent distributions.

$$\mu_n = \sum_{p=1}^{P} o_{p/n} \mu_p \quad (n = 1, \cdots, N) \tag{6}$$

$$(\sigma_n)^2 = \sum_{p=1}^{P} o_{p/n} (\sigma_p)^2 \quad (n = 1, \cdots, N) \tag{7}$$

By using the mean $\mu_n$ and the variance $\rho_n$, the expression (4) can be transformed as follows:

$$v e_n - \sum_{i=1}^{L} h_{l/n} d_l \geq \mu_n + t(\gamma)\sigma_n \quad (n = 1, \cdots, N) \tag{8}$$

$(n=1, \ldots, N)$ \hfill (8), where $t(\gamma)$ is a safety coefficient of a standard normal distribution satisfying $\gamma$.

A linear programming problem obtained by the transformation processing conducted by the equivalent determinate programming problem transformer 105 is formed by the expression (1) of the objective function and the constraint expressions (3), (5), (6), (7) and (8). The optimization section 106 solves this linear programming problem, and obtains the capacities of respective links and the capacities of respective nodes (step S306).

Second Embodiment

Referring to FIG. 4, the communication network design system implements a second embodiment of the present invention with hardware or software, where symbols to be used in the second embodiment are the same as in the first embodiment.

Necessary input data is supplied to an optimization reference generator 201, a path accommodation constraint generator 202, a stochastic lint accommodation constraint generator 203, and a stochastic node constraint generator 204. The optimization reference generator 201 produces an objective function and the other generators 202–204 produce stochastic constraints to produce a stochastic programming problem. The stochastic programming problem is transformed to an equivalent determinate programming problem by an equivalent determinate programming problem transformer 205. An optimization section 206 optimizes the objective function under the equivalent determinate programming problem to produce an optimized network design as an output. The details of network design procedure according to the second embodiment will be described hereinafter.

Referring to FIG. 5, as input data, the system according to the second embodiment is first provided with a network topology, demands each having a requested capacity given by probability distribution, path candidates of respective demands, cost coefficients of link/nodes, link accommodation probabilities, and node accommodation probabilities (step S501).

On the basis of the provided data, the optimization reference generator 201 generates the objective function represented by the following expression (step S502):

$$\text{Minimize}\left[\sum_{i=1}^{L} \omega_1 d_1 + \varepsilon \sum_{n=1}^{N} e_n\right]. \tag{9}$$

The expression (9) means minimization of the cost concerning the links and the cost concerning the nodes.-

The path accommodation condition generator 202 generates the following constraint expression for paths to accommodate the requested capacity of a demand (step S503).

$$\sum_{ip=1}^{lp} r_{ip} \geq 1 \quad (p = 1, \cdots, P) \tag{10}$$

The expression (10) represents the accommodation condition of paths. The expression (10) means that the total of ratios of capacities assigned to path candidates $i_p$ of the demand p is at least 1 when it is assumed that the requested capacity is 1.

The stochastic link accommodation condition generator 203 generates the following constraint expression for a link to accommodate the capacities assigned to paths (step S504).

$$\text{Prob}\left[\sum_{p=1}^{P}\sum_{ip=1}^{lp} g_{ip/l}v_p r_{ip} \leq \lambda d_l\right] \geq \beta \quad (l = 1, \cdots, L) \tag{11}$$

The expression (11) means that the probability that the capacity $d_l$ of the link l exceeds the total of capacities of paths $i_p$ passing through the link l is at least $\beta$.

The stochastic node accommodation condition generator 204 generates a constraint expression for a node to accommodate capacities assigned to paths (step S505).

$$\text{Prob}\left[\sum_{l=1}^{L} h_{l/n}d_l + \sum_{p=1}^{P} o_{p/n}v_p/\lambda \leq ve_n\right] \geq \gamma \quad (n = 1, \cdots, N) \tag{12}$$

$$(n=1,\ldots,N) \tag{12}$$

The expression (12) means that the probability that the capacity of a node n exceeds the termination capacities of the links l and the termination capacities of the demands p is at least $\gamma$.

The expression (9) of the objective function and the constraint expressions (10), (11) and (12) respectively generated by the optimization reference generator 201, the path accommodation condition generator 202, the stochastic link accommodation condition generator 203, and the stochastic node accommodation condition generator 204 form a stochastic programming problem.

The equivalent determinate programming problem transformer 205 transforms this stochastic programming problem into an equivalent determinate programming problem (step S506). It is assumed that the requested capacities $v_p$ follow mutually independent probability distributions, and each probability distribution has mean $\mu_p$ and a variance value $\sigma_p$.

If it is assumed that the sum total of $g_{ip/l}v_p r_{ip}$ for p=1, ..., P, i=1, ..., $i_p$ follows probability distribution having a mean $\mu_l$ and a variance $\sigma_l$, the mean $\mu_l$ and the variance $\sigma_l$ are derived by the following expressions (13) and (14), because the requested capacities $v_p$ are respectively independent.

$$\mu_l = \sum_{p=1}^{P}\sum_{ip=1}^{lp} g_{ip/l}r_{ip}\mu_p \quad (l = 1, \cdots, L) \tag{13}$$

$$(\sigma_l)^2 = \sum_{p=1}^{P}\sum_{ip=1}^{lp} g_{ip/l}(r_{ip})^2(\sigma_p)^2 \quad (l = 1, \cdots, L) \tag{14}$$

$$(l=1,\ldots,L) \tag{14}$$

If it is now assumed that the sum total of $g_{ip/l}v_p r_{ip}$ for p=1, ..., P, i=1, ..., $i_p$ follows a normal distribution, the expression (11) can be transformed as follows:

$$\lambda d_l \geq \mu_l + t(\beta)\sigma_l (l=1,\ldots,L) \tag{15}$$

where $t(\beta)$ is a safety coefficient of a standard normal distribution satisfying $\beta$.

In succession, the equivalent determinate programming problem transformer 205 transforms the expression (12). Since the requested capacities $v_p$ are respectively independent, the mean $\mu_n$ and the variance $\sigma_n$ of the sum total of $o_{p/n}v_p$ for p=1, ..., P are derived as follows:

$$\mu_n = \sum_{p=1}^{P} o_{p/n}\mu_p \quad (n = 1, \cdots, N) \tag{16}$$

$$(\sigma_n)^2 = \sum_{p=1}^{P} o_{p/n}(\sigma_p)^2 \quad (n = 1, \cdots, N) \tag{17}$$

If it is assumed that the sum total of $g_{ip/l}v_p$ for p=1, ..., P follows a normal distribution, the expression (12) can be transformed as follows:

$$ve_n - \sum_{l=1}^{L} h_{l/n}d_l \geq \mu_n + t(\gamma)\sigma_n \quad (n = 1, \cdots, N) \tag{18}$$

$$(n=1,\ldots,N) \tag{18}$$

where $t(\gamma)$ is a safety coefficient of standard normal distribution satisfying $\gamma$.

A linear programming problem obtained by the transformation processing conducted by the equivalent determinate programming problem transformer 205 is formed by the expression (9) of the objective function and the constraint expressions (10), (13), (14), (15), (16), (17) and (18). The optimization means 206 solves this linear programming problem, and obtains the capacities of respective links and the capacity of the node (step S507).

Third Embodiment

Referring to FIG. 6, the communication network design system implements a third embodiment of the present invention with hardware or software, where symbols to be used in the third embodiment are the same as in the first embodiment except that $c_{ip}$ is a capacity [variable of a stochastic programming problem (random variable)] assigned to a path candidate $i_p$ for the requested capacity of a demand p. The basic configuration of the system for implementing the third embodiment is the same as in the second embodiment as shown in FIG. 4.

As input data, the system according to the third embodiment is first provided with a network topology, demands each having a requested capacity given by probability distribution, path candidates of respective demands, cost coefficients of link/nodes, link accommodation probabilities, and node accommodation probabilities (step S601).

On the basis of the provided data, the optimization reference generator 201 generates the objective function represented by the following expression (step S602):

$$\text{Minimize}\left[\sum_{l=1}^{L} \omega_l d_l + \varepsilon\sum_{n=1}^{N} e_n\right]. \tag{19}$$

The expression (19) means minimization of the cost concerning the links and the cost concerning the nodes.

The path accommodation condition generator 202 generates the following constraint expression for paths to accommodate the requested capacity of a demand (step S603):

$$\sum_{i_p=1}^{I_p} c_{ip} \geq v_p \quad (p = 1, \cdots, P), \tag{20}$$

where $c_{ip}$ is a capacity (a variable of a stochastic programming problem or a random variable] assigned to a path candidate $i_p$ for the requested capacity of a demand p.

The expression (20) represents the accommodation condition of paths. The expression (20) means that the total of capacities assigned to path candidates $i_p$ of the demand p is at least the requested capacity $v_p$ of the demand p.

The stochastic link accommodation condition generator 203 generates the following constraint expression for a link to accommodate the capacities assigned to paths (step S604).

$$\text{Prob}\left[\sum_{p=1}^{P}\sum_{i_p=1}^{I_p} g_{ip/l} c_{ip} \leq \lambda d_l\right] \geq \beta \quad (l = 1, \cdots, L) \tag{21}$$

$$(l=1, \ldots, L) \tag{21}$$

The expression (21) means that the probability that the capacity $d_l$ of the link l exceeds the total of capacities of paths $i_p$ passing through the link l is at least $\beta$.

The stochastic node accommodation condition generator 14 generates the following constraint expression for a node to accommodate capacities assigned to paths (step S605).

$$\text{Prob}\left[\sum_{l=1}^{L} h_{l/n} d_l + \sum_{p=1}^{P} o_{p/n} v_p / \lambda \leq v e_n\right] \geq \gamma \quad (n = 1, \cdots, N) \tag{22}$$

$$(n=1, \ldots, N) \tag{22}$$

The expression (22) means that the probability that the capacity of a node n exceeds the termination capacities of the links l and the termination capacities of the demands p is at least $\gamma$.

The expression (19) of the objective function and the constraint expressions (20), (21) and (22) respectively generated by the optimization reference generator 201, the path accommodation condition generator 202, the stochastic link accommodation condition generator 203, and the stochastic node accommodation condition generator 204 form a stochastic programming problem.

The equivalent determinate programming problem transformer 205 transforms this stochastic programming problem into an equivalent determinate programming problem (step S606). If it is assumed that the requested capacities $v_p$ follow mutually independent probability distributions each having mean $\mu_p$ and a variance $\sigma_p$, the mean $\mu_{ip}$ and the variance $\sigma_{ip}$ of a random variable $c_{ip}$ can be represented as follows:

$$\sum_{i_p=1}^{I_p} \mu_{ip} = \mu_p \quad (p = 1, \cdots, P) \tag{23}$$

$$\sum_{i_p=1}^{I_p} (\sigma_{ip})^2 = (\sigma_p)^2 \quad (p = 1, \cdots, P) \tag{24}$$

In succession, the equivalent determinate programming problem transformer 205 transforms the expression (21). If it is assumed that the random variables $c_{ip}$ are mutually independent, the mean $\mu_l$ and the variance $\sigma_l$ of the sum total of $g_{ip/l} c_{ip}$, p=1, ..., P, $i_p$=1, ..., $I_p$, are derived as follows:

$$\mu_l = \sum_{p=1}^{P} \sum_{i_p=1}^{I_p} g_{ip/l} \mu_{ip} \quad (l = 1, \cdots, L) \tag{25}$$

$$(\sigma_l)^2 = \sum_{p=1}^{P} \sum_{i_p=1}^{I_p} g_{ip/l} (\sigma_{ip})^2 \quad (l = 1, \cdots, L) \tag{26}$$

If it is assumed that the sum total of $g_{ip}$/lcip, p=1, ..., P, $i_p$=1, ..., $I_p$ follows normal distribution, the expression (21) can be transformed as follows:

$$\lambda d_l \geq \mu_l + t(\beta) \sigma_l (l=1, \ldots, L) \tag{27}$$

where $t(\beta)$ is a safety coefficient of standard normal distribution satisfying $\beta$.

If it is assumed that the sum total of $o_{p/n} v_p$ p=1, ..., P follows a normal distribution and each of the requested capacities $v_p$ has independent distribution, the mean $\mu_n$ and the variance $\sigma_n$ become as follows:

$$\mu_n = \sum_{p=1}^{P} o_{p/n} (\sigma_n)^2 \quad (n = 1, \cdots, N) \tag{28}$$

$$(\sigma_n)^2 = \sum_{p=1}^{P} o_{p/n} (\sigma_n)^2 \quad (n = 1, \cdots, N) \tag{29}$$

By using the mean $\mu_n$ and the variance $\sigma_n$, the expression (22) can be transformed as follows;

$$v e_n - \sum_{l=1}^{L} h_{l/n} \geq \mu_n + t(\gamma) \sigma_n \quad (n = 1, \cdots, N) \tag{30}$$

where $t(\gamma)$ is a safety coefficient of standard normal distribution satisfying $\gamma$.

A nonlinear programming problem obtained by the transformation processing conducted by the equivalent determinate programming problem transformer 205 is formed by the expression (19) of the objective function and the constraint expressions (23), (24), (25), (26), (27), (28), (29) and (30). The optimization means 206 solves this nonlinear programming problem, and obtains the capacities of respective links and the capacity of the node (step S607).

Fourth Embodiment

First of all, symbols to be used in fourth to sixth embodiments according to the present invention will be described hereinafter.

l: a link number in the range of 1, ..., L.

n: a node number in the range of 1, ..., N.

p: a demand number in the range of 1, ..., P.

s: a network state in the range of 0, ..., S, where 0 represents a normal state where no fault occurs, and each of 1, ..., S represents a fault state in which there is a fault on some link.

$i_p$: a path candidate number in a demand p in the range of 1, ..., $I_p$, where a path candidate $i_p$ of the demand p is an arbitrary path between an originating node and a terminating node of the demand p, and is provided as an input.

$\omega_l$: a cost efficient of a link l.

$\epsilon$: a cost efficient of a node.

$g_{ip/l}$: an indicator indicating 1 when a path $i_p$ of a demand p passes through a link l (as represented by $i_{p/l}$) and indicating 0 otherwise.

$h_{l/n}$: an indicator indicating 1 when a link l passes through a node n (as represented by l/n) and indicating 0 otherwise.

$o_{p/n}$: an indicator indicating 1 when a demand p terminates at a node n (as represented by p/n), and indicating 0 otherwise.

$\lambda$: a capacity of a unit of link. For example, in a light-wave network, $\lambda$ represents the number of wavelength paths accommodated by one optical fiber.

$\nu$: a capacity of a unit of node. For example, in a light-wave network, $\nu$ represents the number of wavelength paths accommodated by one optical cross-connect.

$v_p$: a requested capacity of a demand p indicating a random variable having mean $\mu_p$ and a variance $\sigma_p$.

$f_{l/a}$: an indicator indicating 0 when a link l is faulty, and indicating 1 when the link l is normal. In the normal state represented as s=0, $f_{l/a}$=1 in every link l.

$\alpha$: a probability (path accommodation probability) that a requested capacity $v_p$ of a demand p is assigned to path candidates of the demand p.

$\beta$: a probability (link accommodation probability) that the total of capacities of paths $i_p$ passing through a link l can be accommodated by the link l.

$\gamma$: a probability (node accommodation probability) that the total of capacities of links terminating at a node n and a capacity of paths $i_p$ terminating at the node n can be accommodated in the node n.

$c_{ipa}$: capacity (integer variable) assigned to a path $i_p$ of a demand p in a state s.

$r_{ip\epsilon}$: a ratio (real number variable) assigned to a path candidate $i_p$ when it is assumed that a requested capacity of a demand p is 1.

$d_l$: a capacity (integer variable) assigned to a link l.

$e_n$: a capacity (integer variable) assigned to a node n.

Referring to FIG. 7, the communication network design system implements a fourth embodiment of the present invention with hardware or software. In the preferred embodiment, a network design procedure according to the first embodiment is implemented by a computer running a network design program thereon. The network design program according to the first embodiment is previously stored in a read-only memory (ROM), a magnetic storage, or the like (not shown) The basic configuration of the system for implementing the fourth embodiment is the same as in the first embodiment as shown in FIG. 2.

As input data, the system is first provided with a network topology, demands each having a requested capacity given by probability distribution, path candidates of the respective demands, cost coefficients of link/nodes, link accommodation probabilities, node accommodation probabilities, and a conceivable fault scenario (step S701). Here, the fault scenario is a set of fault scenarios in the case where a set of simultaneously occurring link faults is defined as one fault scenario.

On the basis of the provided data, the optimization reference generator 101 generates the objective function represented by the following expression (step S702):

$$\text{Minimize} \left[ \sum_{l=1}^{L} \omega_l d_l + \varepsilon \sum_{n=1}^{N} e_n \right] \quad (31)$$

The expression (31) means minimization of the cost concerning the links and the cost concerning the nodes.

The stochastic path accommodation condition generator 102 generates the following constraint expression for paths to accommodate the requested capacity of a demand (step S702).

$$\text{Prob}\left[ \sum_{ip=1}^{Ip} c_{ips} \le v_p \right] \ge \alpha \quad (p=1,\cdots,P, s=0,\cdots,S) \quad (32)$$

$(p=1, \ldots, P, s=0, \ldots, S)$ (32)

The expression (32) means that the probability that the total of capacities assigned to path candidates $i_p$ of a demand p exceeds a requested capacity $v_p$ of the demand p in the state s is at least $\alpha$.

The link accommodation condition generator 103 generates the following constraint expression for a link to accommodate capacities assigned to paths (step S704).

$$\sum_{p=1}^{P} \sum_{ip=1}^{Ip} g_{ip/l} c_{ip\varepsilon} \le \lambda d_l \quad (l=1,\cdots,L, s=0,\cdots,S) \quad (33)$$

$(l=1, \ldots, L, s=0, \ldots, S)$ (33)

The expression (33) means that the capacity $d_l$ of a link l exceeds the total of capacities of paths $i_p$ passing through the link l in a state s.

The stochastic node accommodation condition generator 104 generates the following constraint expression for a node to accommodate the capacities assigned to paths (step S705).

$$\text{Prob}\left[ \sum_{l=1}^{L} h_{l/n} d_l + \sum_{p=1}^{P} o_{p/n} v_p / \lambda \le v e_n \right] \ge \gamma \quad (n=1,\cdots,N) \quad (34)$$

$(n=1, \ldots, N)$ (34)

The expression (34) means that the probability that the capacity of a node n exceeds the termination capacities of the links l and the termination capacities of the demands p is at least $\gamma$.

The expression (31) of the objective function and the constraint expressions (32), (33) and (34) respectively generated by the optimization reference generator 101, the stochastic path accommodation constraint generator 102, the link accommodation constraint generator 103, and the stochastic node accommodation constraint generator 104 form a stochastic programming problem.

The equivalent determinate programming problem transformer 105 transforms this stochastic programming problem into an equivalent determinate programming problem (step S706). If it is assumed that the requested capacities $v_p$ follow normal distributions each of which has mean $\mu_p$ and variance $\sigma_p$ and which are mutually independent, the expression (32) can be transformed as follows:

$$\sum_{ip=1}^{lp} c_{ipe} \geq \mu_p + t(\alpha)\sigma_p \quad (p=1,\cdots,P, s=0,\cdots,S) \quad (35)$$

$$(p=1,\ldots,P, s=0,\ldots,S) \quad (35)$$

where $t(\alpha)$ is a safety coefficient of standard normal distribution satisfying $\alpha$.

In succession, the equivalent determinate programming problem transformer 105 transforms the expression (34). If it is assumed that the sum total of $o_{p/n}v_p$ for p=1, ..., P follows a normal distribution having mean $\mu_n$ and variance $\sigma_n$ and each of the requested capacities $v_p$ has independent distribution, the mean $\mu_n$ and the variance $\sigma_n$ are derived as follows:

$$\mu_n = \sum_{p=1}^{P} o_{p/n}\mu_p \quad (n=1,\cdots,N) \quad (36)$$

$$(\sigma_n)^2 = \sum_{p=1}^{P} o_{p/n}(\sigma_p)^2 \quad (n=1,\cdots,N) \quad (37)$$

By using the mean $\mu_n$ and the variance $\sigma_n$, the expression (34) can be transformed as follows:

$$ve_n - \sum_{l=1}^{L} h_{l/n}d_l \geq \mu_n + t(\gamma)\sigma_n \quad (n=1,\cdots,N) \quad (38)$$

$$(n=1,\ldots,N) \quad (37)$$

where $t(\gamma)$ is a safety coefficient of standard normal distribution satisfying $\gamma$.

A linear programming problem obtained by the transformation processing conducted by the equivalent determinate programming problem transformer 109 is formed by the expression (31) of the objective function and the constraint expressions (33), (35), (36), (37) and (38). The optimization means 106 solves this linear programming problem, and obtains the capacities of respective links and the capacity of the node (step S707).

Fifth Embodiment

The communication network design system implements a fifth embodiment of the present invention with hardware or software. In the preferred embodiment, a network design procedure according to the fifth embodiment is implemented by a computer running a network design program thereon. The network design program according to the fifth embodiment is previously stored in a read-only memory (ROM), a magnetic storage, or the like (not shown). The basic configuration of the system for implementing the fifth embodiment is the same as in the second embodiment as shown in FIG. 4. The network design method according to the fifth embodiment is capable of coping with link faults in the second embodiment. Symbols to be used in the fifth embodiment are the same as in the fourth embodiment.

Referring to FIG. 8, as input data, the system is first provided with a network topology, demands each having a requested capacity given by probability distribution, path candidates of respective demands, cost coefficients of link/nodes, link accommodation probabilities, node accommodation probabilities, and conceivable faults (step S801).

On the basis of the provided data, the optimization reference generator 201 generates the objective function represented by the following expression (step S801):

$$\text{Minimize}\left[\sum_{l=1}^{L} \omega_l d_l + \varepsilon \sum_{n=1}^{N} e_n\right] \quad (39)$$

The expression (39) means minimization of the cost concerning the links and the cost concerning the nodes.

The path accommodation condition generator 202 generates the following constraint expression for paths to accommodate the requested capacity of a demand (step S802).

$$\sum_{ip=1}^{lp} r_{ipe} \geq \quad (p=1,\cdots,P, s=0,\cdots,S) \quad (40)$$

The expression (40) represents the accommodation condition of paths. The expression (40) means that the total of capacities assigned to path candidates $i_p$ of the demand p is at least 1 with respect to the requested capacity.

The stochastic link accommodation condition generator 203 generates the following constraint expression for a link to accommodate the capacities assigned to paths (step S804).

$$\text{Prob}\left[\sum_{p=1}^{P}\sum_{ip=1}^{lp} g_{ip/l}v_p r_{ipe} \leq f_{l/\varepsilon}\lambda d_l\right] \geq \beta \quad (l=1,\cdots,L, s=0,\cdots,S) \quad (41)$$

$$(l=1,\ldots,L, s=0,\ldots,S) \quad (41)$$

The expression (41) means that the probability that the capacity $d_l$ of the link l exceeds the total of capacities of paths $i_p$ passing through the link l in the state s is at least $\beta$.

The stochastic node accommodation condition generator 204 generates the following constraint expression for a node to accommodate capacities assigned to paths (step S805).

$$\text{Prob}\left[\sum_{l=1}^{L} h_{l/n}d_l + \sum_{p=1}^{P} o_{p/n}v_p/\lambda \leq ve_n\right] \geq \gamma \quad (n=1,\cdots,N) \quad (42)$$

$$(n=1,\ldots,N) \quad (42)$$

The expression (42) means that the probability that the capacity of a node n exceeds the termination capacities of the links l and the termination capacities of the demands p is at least $\gamma$.

The expression (39) of the objective function and the constraint expressions (40), (41) and (42) respectively generated by the optimization reference generator 201, the path accommodation condition generator 202, the stochastic link accommodation condition generator 203, and the stochastic node accommodation condition generator 204 form a stochastic programming problem.

The equivalent determinate programming problem transformer 205 transforms this stochastic programming problem into an equivalent determinate programming problem (step S806). If it is assumed that the requested capacities $v_p$ follow mutually independent normal distributions each having mean $\mu_p$ and variance $\sigma_p$, then the mean $\mu_l$ and the variance $\sigma_l$ of the sum total of $g_{ip/l}v_p r_{ipa}$ for p=1, ..., P, $i_p$=1, ..., $I_p$ can be derived as follows:

$$\mu_l = \sum_{p=1}^{P}\sum_{ip=1}^{lp} g_{ip/l} r_{ipe}\mu_p \quad (l=1,\cdots,L) \tag{43}$$

$$(\sigma_l)^2 = \sum_{p=1}^{P}\sum_{ip=1}^{lp} g_{ip/l}(r_{ipe})^2(\sigma_p)^2 \quad (l=1,\cdots,L) \tag{44}$$

$$(l=1,\ldots,L) \tag{44}$$

If it is now assumed that the sum total of $g_{ip/l}v_p r_{ipe}$ for p=1, ..., P, i=1, ..., $I_p$ follows a normal distribution, the expression (41) can be transformed as follows:

$$\lambda d_l \geq \mu_l + t(\beta)\sigma_l \; (l=1,\ldots,L) \tag{45}$$

where $t(\beta)$ is a safety coefficient of standard normal distribution satisfying $\beta$.

In succession, the equivalent determinate programming problem transformer 205 transforms the expression (42). Since the requested capacities $v_p$ are respectively independent, the mean $\mu_n$ and the variance $\sigma_n$ of the sum total of $o_{p/n}v_p$ for p=1, ..., P derived as follows:

$$\mu_n = \sum_{p=1}^{P} o_{p/n}\mu_p \quad (n=1,\cdots,N) \tag{46}$$

$$(\sigma_n)^2 = \sum_{p=1}^{P} o_{p/n}(\sigma_p)^2 \quad (n=1,\cdots,N) \tag{47}$$

If it is assumed that the sum total of $o_{p/n}v_p$ for p=1, ..., P follows a normal distribution, the expression (52) can be transformed as follows:

$$ve_n - \sum_{l=1}^{L} h_{l/n} \geq \mu_n + t(\gamma)\sigma_n \quad (n=1,\cdots,N) \tag{48}$$

where $t(\gamma)$ is a safety coefficient of standard normal distribution satisfying $\gamma$.

A nonlinear programming problem obtained by the transformation processing conducted by the equivalent determinate programming problem transformer 205 is formed by the expression (39) of the objective function and the constraint expressions (40), (43), (44), (45), (46), (47) and (48). The optimization section 206 solves this nonlinear programming problem, and obtains the capacities of respective links and the capacity of the node (step S807).

Sixth Embodiment

The communication network design system implements a sixth embodiment of the present invention with hardware or software. In the preferred embodiment, a network design procedure according to the sixth embodiment is implemented by a computer running a network design program thereon. The network design program according to the sixth embodiment is previously stored in a read-only memory (ROM), a magnetic storage, or the like (not shown). The basic configuration of the system for implementing the sixth embodiment is the same as in the second embodiment as shown in FIG. 4. The network design method according to the sixth embodiment is capable of coping with link faults in the second embodiment. Symbols to be used in the sixth embodiment are the same as in the fourth embodiment except that $c_{ip\epsilon}$ is a capacity [variable of a stochastic programming problem (random variable)] assigned to a path $i_p$ in a state s with respect to a requested capacity of a demand p.

Referring to FIG. 9, as input data, the system is first provided with a network topology, demands each having a requested capacity given by probability distribution, path candidates of the respective demands, cost coefficients of link/nodes, link accommodation probabilities, node accommodation probabilities, and conceivable faults (step S901).

On the basis of the input data, the optimization reference generator 201 generates the objective function represented by the following expression (step S902):

$$\text{Minimize}\left[\sum_{l=1}^{L}\omega_l d_l + \varepsilon\sum_{n=1}^{N} e_n\right] \tag{49}$$

The expression (49) means minimization of the cost concerning the links and the cost concerning the nodes.

The path accommodation condition generator 202 generates the following constraint expression for paths to accommodate the requested capacity of a demand (step S903).

$$\sum_{ip=1}^{lp} c_{ip\epsilon} \geq v_p \quad (p=1,\cdots,P, s=0,\cdots,S) \tag{50}$$

The expression (50) represents the accommodation condition of paths. The expression (50) means that the total of capacities assigned to path candidates $i_p$ of the demand p in the state s is at least the requested capacity $v_p$ of the demand p.

The stochastic link accommodation condition generator 203 generates the following constraint expression for a link to accommodate the capacities assigned to paths (step S904).

$$\text{Prob}\left[\sum_{p=1}^{P}\sum_{ip=1}^{lp} g_{ip/l} c_{ips} \leq \lambda f_{l/s} d_l\right] \geq \beta \quad (l=1,\cdots,L, s=0,\cdots,S) \tag{51}$$

$$(l=1,\ldots,L, s=0,\ldots,S) \tag{51}$$

The expression (51) means that the probability that the capacity $d_l$ of the link l exceeds the total of capacities of paths $i_p$ passing through the link l in the state s is at least $\beta$.

The stochastic node accommodation condition generator 204 generates the following constraint expression for a node to accommodate capacities assigned to paths (step S905).

$$\text{Prob}\left[\sum_{l=1}^{L} h_{l/n} d_l + \sum_{p=1}^{P} o_{p/n}v_p/\lambda \leq ve_n\right] \geq \gamma \quad (n=1,\cdots,N) \tag{52}$$

The expression (52) means that the probability that the capacity of a node n exceeds the termination capacities of the links l and the termination capacities of the demands p is at least $\gamma$.

The expression (49) of the objective function and the constraint expressions (50), (51) and (52) respectively generated by the optimization reference generator 201, the path accommodation condition generator 202, the stochastic link accommodation condition generator 203, and the stochastic node accommodation condition generator 204 form a stochastic programming problem.

The equivalent determinate programming problem transformer 205 transforms this stochastic programming problem into an equivalent determinate programming problem (step S906). If it is assumed that the requested capacities $v_p$ follow mutually independent normal distributions each having mean $\mu_p$ and variance $\sigma_p$, then the mean $\mu_{ips}$ and the variance $\sigma_{ips}$ of the random variable $c_{ips}$ can be derived as follows:

$$\sum_{ip=1}^{lp} \mu_{ipe} \leq \mu_p \quad (p = 1, \cdots, P, s = 0, \cdots, S) \tag{53}$$

$$\sum_{ip=1}^{lp} (\sigma_{ipe})^2 = (\sigma_p)^2 \quad (p = 1, \cdots, P, s = 0, \cdots, S) \tag{54}$$

$$(p=1, \ldots, P, s=0, \ldots, S) \tag{54}$$

In succession, the equivalent determinate programming problem transformer 205 transforms the expression (51). If it is assumed that the random variables $c_{ips}$ have mutually independent distributions, the mean value $\mu_{la}$ and the variance value $\sigma_{ls}$ of the sum total of $g_{ip/l}c_{ips}$ for p=1, ..., P, $i_p=1, \ldots, I_p$ can be derived as follows:

$$\mu_{ls} = \sum_{p=1}^{P}\sum_{ip=1}^{lp} g_{ip/1}\mu_{ipe} \quad (p = 1, \cdots, P, s = 0, \cdots, S) \tag{55}$$

$$(\sigma_{1e})^2 = \sum_{p=1}^{P}\sum_{ip=1}^{lp} g_{ip/1}(\sigma_{ipe})^2 \quad (p = 1, \cdots, P, s = 0, \cdots, S) \tag{56}$$

$$(p=1, \ldots, P, s=0, \ldots, S) \tag{56}$$

If it is assumed that the sum total of $g_{ip}c_{ips}$ for p=1, ..., P, $i_p=1, \ldots, I_p$ follows a normal distribution, the expression (51) can be transformed as follows:

$$\lambda f_{l/s} \geq \mu_{ls} + t(\beta)\sigma_{ls} \quad (l=1, \ldots, L, s=0, \ldots, S) \tag{57}$$

where $t(\beta)$ is a safety coefficient of standard normal distribution satisfying $\beta$.

Furthermore, If it is now assumed that each of the requested capacities $v_p$ has an independent distribution, the mean value $\mu_p$ and the variance $\sigma_n$ of the sum total of $o_{p/n}v_p$ for p=1, ..., P are derived as follows:

$$\mu_n = \sum_{p=1}^{P} o_{p/n}\mu_p \quad (n = 1, \cdots, N) \tag{58}$$

$$(\sigma_n)^2 = \sum_{p=1}^{P} o_{p/n}(\sigma_p)^2 \quad (n = 1, \cdots, N) \tag{59}$$

If it is assumed that the sum total of $o_{p/n}v_p$ for p=1, ... P follows a normal distribution, the expression (52) can be transformed as follows:

$$ve_n - \sum_{l=1}^{L} h_{l/n} \geq \mu_n + t(\gamma)\sigma_n \quad (n = 1, \cdots, N) \tag{60}$$

where $t(\gamma)$ is a safety coefficient of standard normal distribution satisfying $\gamma$.

A nonlinear programming problem obtained by the transformation processing conducted by the equivalent determinate programming problem transformer 205 is formed by the expression (49) of the objective function and the constraint expressions (53), (54), (55), (56), (57), (58), (59) and (60). The optimization means 206 solves this nonlinear programming problem, and obtains the capacities of respective links and the capacity of the node (step S907).

As described above, such a stochastic programming problem as to minimize the cost under given stochastic accommodation conditions concerning capacities of paths, links and nodes is set by the optimization reference generator 101 or 201, the stochastic pass accommodation constraint generator 102 or the path accommodation condition generator 202, the link accommodation condition generator 103 or the stochastic link accommodation condition generator 203, and the stochastic node accommodation constraint generator 104 or the stochastic node accommodation condition generator 204. This stochastic programming problem is transformed to an equivalent determinate programming problem by the equivalent determinate programming problem transformer 105 or 205. The equivalent determinate programming problem is solved by the optimization section 106 or 206. As a result, it is possible to design a network which can accommodate traffics even if the traffic pattern changes to some degree and which can be constructed at a low cost.

As described above, according to the present invention a predetermined set of stochastic constraints are generated by using the requested capacity of the demand to produce a stochastic programming problem and then the stochastic programming problem is converted into an equivalent determinate programming problem on condition of the predetermined probability distribution. The determinate programming problem is solved to determine capacities of the nodes and the links so that the objective function is minimized. This brings about an effect that the traffics can be accommodated even if a demand pattern changes to some degree.

What is claimed is:

1. A method for designing a communication network composed of a plurality of nodes and links each connecting two nodes, comprising the steps of:

a) inputting network data including a requested capacity of a demand as a random variable following a predetermined probability distribution between any two nodes and path candidates of the demand for accommodating the requested capacity of the demand:

b) generating an objective function representing a total cost of the nodes and the links from the network data;

c) generating a predetermined set of stochastic constraints by using the requested capacity of the demand to produce a stochastic programming problem including the objective function and the stochastic constraints;

d) converting the stochastic programming problem into an equivalent determinate programming problem on condition of the predetermined probability distribution: and e) solving the determinate programming problem to determine capacities of the nodes and the links so that the objective function is minimized.

2. The method according to claim 1, wherein the step c) comprises the steps of:
   c-1) generating a stochastic path accommodation constraint for causing the requested capacity of the demand to be accommodated in the path candidates;
   c-2) generating a link accommodation constraint for causing capacities assigned to path candidates to be accommodated in the links; and
   c-3) generating a stochastic node accommodation constraint for causing a total of capacities of path candidates passing through a node to be accommodated in the node.

3. The method according to claim 2, wherein, in the step c-1), the stochastic path accommodation constraint causes a probability that a total of capacities assigned to path candidates of a demand is not smaller than the requested capacity of the demand to be at least a predetermined path accommodation probability,
   in the step c-2), the link accommodation constraint causes a total of capacities of path candidates passing through a link to be accommodated in the link, and
   in the step c-3), the stochastic node accommodation constraint causes a probability that a capacity assigned to a node exceeds a total of termination capacity of a link and termination capacity of the demand to be at least a predetermined node accommodation probability.

4. The method according to claim 3, wherein the stochastic path accommodation constraint generated in the step c-1) is represented by:

$$\text{Prob}\left[\sum_{i_p=1}^{I_p} c_{ip} \geq v_p\right] \geq \alpha \quad (p = 1, \cdots, P),$$

where
   Prob [ ] represents a probability that the condition in [ ] is satisfied,
   p is a demand number,
   $i_p$ is a candidate number of a demand p in the range of 1, ..., $I_p$ where a path candidate $i_p$ of a demand p is an arbitrary path between an originating node and a terminating node of a demand p,
   $c_{ip}$ is a capacity (integer variable) assigned to a path candidate $i_p$ of a demand p,
   $v_p$ is a requested capacity (random variable) of a demand p, and
   $\alpha$ is a probability (path accommodation probability) that the requested capacity $v_p$ of a demand p is assigned to path candidates of the demand p;
the link accommodation constraint generated by the step c-2) is represented by:

$$\sum_{p=1}^{P} \sum_{i_p=1}^{I_p} g_{ip/l} c_{ip} \leq \lambda d_l \quad (l = 1, \cdots, L)$$

where
   l: is a link number,
   $g_{ip/l}$ is an indicator indicating 1 when a path candidate $i_p$ of a demand p passes through a link l (as represented by ip/l) and indicating 0 otherwise,
   $d_l$ is a capacity (integer variable) assigned to a link l, and
   $\lambda$ is a capacity of a link, and
the stochastic node accommodation constraint generated by the step c-3) is represented by:

$$\text{Prob}\left[\sum_{l=1}^{L} h_{l/n} d_l + \sum_{p=1}^{P} o_{p/n} v_p / \lambda \leq v e_n\right] \geq \gamma \quad (n = 1, \cdots, N),$$

$(n=1, \ldots, N)$ where
   n is a node number,
   $h_{l/n}$ is an indicator indicating 1 when a link l passes though node n (as represented by l/n) and indicating 0 otherwise,
   $o_{p/n}$ is an indicator indicating 1 when a demand p terminates at a node n (as represented by p/n) and indicating 0 otherwise,
   v is a capacity of a node,
   $e_n$ is a capacity (integer variable) assigned to a node n, and
   $\gamma$ is a probability (node accommodation probability) that the total of capacities of links terminating at a node n and capacities of paths $i_p$ terminating at the node n can be accommodated in the node n.

5. The method according to claim 4, wherein the step d) comprises the steps of:
   d-1) converting the stochastic path accommodation constraint to a determinate path accommodation constraint on condition that the requested capacity of the demand follows a normal distribution having a mean $\mu_p$ and a variance $\sigma_p$, wherein the determinate path accommodation constraint is represented by:

$$\sum_{i_p=1}^{I_p} c_{ip} \geq \mu_p + t(\alpha)\sigma_p \quad (p = 1, \cdots, P)$$

where $t(\alpha)$ is a safety coefficient of a standard normal distribution satisfying $\alpha$; and
   d-2) converting the stochastic node accommodation constraint to a determinate node accommodation constraint on condition that a sum of $o_{p/n}v_p$ for p=1, ..., P follows a normal distribution having a mean $\mu_n$ and a variance $\sigma_n$, wherein the mean $\mu_n$ and the variance $\sigma_n$ are represented by:

$$\mu_n = \sum_{p=1}^{P} o_{p/n}\mu_p \quad (n = 1, \cdots, N) \text{ and}$$

$$(\sigma_n)^2 = \sum_{p=1}^{P} o_{p/n}(\sigma_p)^2 \quad (n = 1, \cdots, N), \text{ respectively,}$$

and the determinate node accommodation constraint is represented by:

$$v e_n - \sum_{l=1}^{L} h_{l/n} d \geq \mu_n + t(\gamma)\sigma_n \quad (n = 1, \cdots, N),$$

$(n=1, \ldots, N)$, where $t(\gamma)$ is a safety coefficient of a standard normal distribution satisfying $\gamma$.

6. The method according to claim 5, wherein the equivalent determinate programming problem consists of:
the objective function represented by:

$$\sum_{l=1}^{L} \omega_l d_l + \varepsilon \sum_{n=1}^{N} e_n$$

where $\omega_l$ is a cost coefficient of a link l and $\epsilon$ is a cost coefficient of a node, and
the determinate constraints consisting of:
the determinate path accommodation constraint represented by:

$$\sum_{i_p=1}^{I_p} c_{ip} \geq \mu_p + t(\alpha)\sigma_p \quad (p=1,\cdots,P),$$

the link accommodation constraint represented by:

$$\sum_{p=1}^{P} \sum_{i_p=1}^{I_p} g_{ip/l} c_{ip} \leq \lambda d_l \quad (l=1,\cdots,L), \text{ and}$$

the determinate node accommodation constraint represented by:

$$v e_n - \sum_{l=1}^{L} h_{l/n} d_l \geq \mu_n + t(\gamma)\sigma_n \quad (n=1,\ldots,N).$$

7. The method according to claim 1, wherein the step c) comprises the steps of:
   c-1) generating a path accommodation constraint for causing the requested capacity of the demand to be accommodated in the path candidates;
   c-2) generating a stochastic link accommodation constraint for causing capacities assigned to path candidates to be accommodated in the links; and
   c-3) generating a stochastic node accommodation constraint for causing a total of capacities of path candidates passing through a node to be accommodated in the node.

8. The method according to claim 7, wherein,
   in the step c-1), the path accommodation constraint causes a total of ratios of capacities assigned to path candidates of a demand to be at least 1 when it is assumed that the requested capacity of the demand is 1,
   in the step c-2), the stochastic link accommodation constraint causes a probability that a capacity of a link exceeds the total of capacities of path candidates passing through the link to be at least a predetermined link accommodation probability, and
   in the step c-3), the stochastic node accommodation constraint causes a probability that a node capacity exceeds a total of termination capacity of a link and termination capacity of the demand to be at least a predetermined node accommodation probability.

9. The method according to claim 8, wherein the path accommodation constraint generated in the step c-1) is represented by:

$$\sum_{i_p=1}^{I_p} r_{ip} \geq 1 \quad (p=1,\ldots,P)$$

where p is a demand number,
$i_p$ is a candidate, number of a demand p in the range of $1,\ldots,I_p$, where a path candidate $i_p$ of a demand p is an arbitrary path between an originating node and a terminating node of a demand p, and
$r_{ip}$ is a ratio (real number variable) assigned to a path candidate $i_p$ when it is assumed that a requested capacity of a demand p is 1,
the stochastic link accommodation constraint generated by the step c-2) is represented by:

$$\text{Prob}\left[\sum_{p=1}^{P} \sum_{ip=1}^{Ip} g_{ip/l} v_p r_{ip} \leq \lambda d_l\right] \geq \beta$$

$(l=1,\ldots,L)$ where
Prob [ ] represents a probability that the condition in [ ] is satisfied.
l: a link number,
$g_{ip/l}$ is an indicator indicating 1 when a path candidate $i_p$ of a demand p passes through a link l (as represented by ip/l) and indicating 0 otherwise,
$d_l$ is a capacity (integer variable) assigned to a link l,
$\lambda$ is a capacity of a link,
$v_p$ is a requested capacity (random variable) of a demand p, and
$\beta$: a probability (link accommodation probability) that the total of capacities of paths $i_p$ passing through a link l can be accommodated in the link l, and
the stochastic node accommodation constraint generated by the step c-3) is represented by:

$$\text{Prob}\left[\sum_{l=1}^{L} h_{l/n} d_l + \sum_{p=1}^{P} o_{p/n} v_p / \lambda \leq v e_n\right] \geq \gamma$$

$(n=1,\ldots,N)$ where
n is a node number,
$h_{l/n}$ is an indicator indicating 1 when a link l passes though node n (as represented by l/n) and indicating 0 otherwise,
$o_{p/n}$ is an indicator indicating 1 when a demand p terminates at a node n (as represented by p/n) and indicating 0 otherwise,
v is a capacity of a node,
$e_n$ is a capacity (integer variable) assigned to a node n, and
$\gamma$ is a probability (node accommodation probability) that the total of capacities of links terminating at a node n and capacities of paths $i_p$ terminating at the node n can be accommodated in the node n.

10. The method according to claim 9, wherein the step d) comprises the steps of:
    d-1) converting the stochastic link accommodation constraint to a determinate link accommodation constraint on condition that the requested capacity of the demand follows a normal distribution having a mean $\mu_p$ and a variance $\sigma_p$, and a sum of $g_{ip/l} v_p r_{ip}$ for $p=1,\ldots,P$, $i=1, \ldots, i_p$ is follows probability distribution having a mean $\mu_l$ and a variance a $\sigma_l$ that are represented by:

$$\mu_l = \sum_{p=1}^{P} \sum_{ip=1}^{Ip} g_{ip/l} r_{ip} \mu_p \quad (l = 1, \ldots, L) \text{ and}$$

$$(\sigma_l)^2 = \sum_{p=1}^{P} \sum_{ip=1}^{Ip} g_{ip/l} (r_{ip})^2 (\sigma_p)^2 \quad (l = 1, \ldots, L),$$

respectively, and further on condition that a sum of $g_{ip/l} v_p r_{ip}$ for $p=1, \ldots, P$, $i_p=1, \ldots, I_p$ follows a normal distribution, wherein the determinate link accommodation constraint is represented by:

$$\lambda d_l \geq \mu_l + t(\beta) \sigma_l \ (l=1, \ldots, L)$$

where $t(\beta)$ is a safety coefficient of a standard normal distribution satisfying $\beta$, and d-2) converting the stochastic node accommodation constraint to a determinate node accommodation constraint on condition that a sum of $o_{p/n} v_p$ for $p=1, \ldots, P$ follows a normal distribution having a mean $\mu_n$ and a variance $\sigma_n$, wherein the mean $\mu_n$ and the variance are represented by:

$$\mu_n = \sum_{p=1}^{P} o_{p/n} \mu_p \quad (n = 1, \ldots, N) \text{ and}$$

$$(\sigma_n)^2 = \sum_{p=1}^{P} o_{p/n} (\sigma_p)^2 \quad (n = 1, \ldots, N), \text{ respectively,}$$

and the determinate node accommodation constraint is represented by:

$$ve_n - \sum_{l=1}^{L} h_{l/n} d_l \geq \mu_n + t(\gamma) \sigma_n$$

$(n=1, \ldots, N)$ where $t(\gamma)$ is a safety coefficient of a standard normal distribution satisfying $\gamma$.

11. The method according to claim 10, wherein the equivalent determinate programming problem consists of:
the objective function represented by:

$$\sum_{l=1}^{L} \omega_l d_l + \varepsilon \sum_{n=1}^{N} e_n$$

where $\omega_l$ is a cost coefficient of a link l and $\epsilon$ is a cost coefficient of a node, and
the determinate constraints consisting of:
the path accommodation constraint represented by:

$$\sum_{ip=1}^{Ip} r_{ip} \geq 1 \quad (p = 1, \ldots, P),$$

the determinate link accommodation constraint represented by:

$$\lambda d_l \geq \mu_l + t(\beta) \sigma_l \ (l=1, \ldots, L),$$

and the determinate node accommodation constraint represented by:

$$ve_n - \sum_{l=1}^{L} h_{l/n} d_l \geq \mu_n + t(\gamma) \sigma_n \quad (n = 1, \ldots, N).$$

12. The method according to claim 7, wherein,
in the step c-1), the path accommodation constraint causes a total of capacities assigned to path candidates of a demand to be at least the requested capacity of the demand, in the step c-2), the stochastic link accommodation constraint causes a probability that a capacity of a link exceeds a total of capacities of paths passing through the link to be at least a predetermined link accommodation probability, and in the step c-3), the stochastic node accommodation constraint causes a probability that a node capacity exceeds a total of termination capacity of a link and termination capacity of the demand to be at least a predetermined node accommodation probability.

13. The method according to claim 12, wherein the path accommodation constraint generated in the step c-1) is represented by:

$$\sum_{ip=1}^{Ip} c_{ip} \geq v_p \quad (p = 1, \cdots, P),$$

where p is a demand number, $i_p$ is a candidate number of a demand p in the range of $1, \ldots, I_p$, where a path candidate $i_p$ of a demand p is an arbitrary path between an originating node and a terminating node of a demand p, $c_{ip}$ is a capacity as a random variable assigned to a path candidate $i_p$, and $v_p$ is a requested capacity (random variable) of a demand p, the stochastic link accommodation constraint generated by the step c-2) is represented by:

$$\text{Prob}\left[\sum_{p=1}^{P} \sum_{ip=1}^{Ip} g_{ip/l} v_p r_{ip} \leq \lambda d_l\right] \geq \beta \quad (l = 1, \cdots, L)$$

where

Prob [ ] represents a probability that the condition in [ ] is satisfied, l: a link number, $g_{ip/l}$ is an indicator indicating 1 when a path candidate $i_p$ of a demand p passes through a link l (as represented by ip/l) and indicating 0 otherwise, $d_l$ is a capacity (integer variable) assigned to a link $\lambda$ is a capacity of a link, $v_p$ is a requested capacity (random variable) of a demand p, and $r_{ip}$ is a ratio (real number variable) assigned to a path candidate $i_p$ when it is assumed that a requested capacity of a demand p is 1, $\beta$: a probability (link accommodation probability) that the total of capacities of paths $i_p$ passing through a link l can be accommodated in the link l, and the stochastic node accommodation constraint generated by the step c-3) is represented by:

$$\text{Prob}\left[\sum_{l=1}^{L} h_{l/n}d_l + \sum_{p=1}^{P} o_{p/n}v_p/\lambda \le ve_n\right] \ge \gamma \quad (n = 1, \cdots, N)$$

where n is a node number, $h_{l/n}$ is an indicator indicating 1 when a link l passes though node n (as represented by l/n) and indicating 0 otherwise, $o_{p/n}$ is an indicator indicating 1 when a demand p terminates at a node n (as represented by p/n) and indicating 0 otherwise, v is a capacity of a node, $e_n$ is a capacity (integer variable) assigned to a node n, and γ is a probability (node accommodation probability) that the total of capacities of links terminating at a node n and capacities of paths $i_p$ terminating at the node n can be accommodated in the node n.

14. The method according to claim 13, wherein the step d) comprises the steps of:

d-1) converting the stochastic link accommodation constraint to a determinate link accommodation constraint on condition that the requested capacity of the demand follows a normal distribution having a mean $\mu_p$ and a variance $\sigma_p$, wherein a mean $\mu_{ip}$ and a variance $\sigma_{ip}$ of a random variable $c_{ip}$ is represented by:

$$\sum_{ip=1}^{Ip} \mu_{ip} = \mu_p \quad (p = 1, \cdots, P) \text{ and}$$

$$\sum_{ip=1}^{Ip} (\sigma_{ip})^2 = (\sigma_p)^2 \quad (p = 1, \cdots, P), \text{ respectively, and}$$

a sum of $g_{ip/l}v_p r_{ip}$ for p=1, . . . , P and $i_p$=1, . . . , $I_p$ follows a probability distribution having a mean $\mu_l$ and a variance $\sigma_l$ that are represented by:

$$\mu_l = \sum_{p=1}^{P} \sum_{ip=1}^{Ip} g_{ip/l}\mu_p \quad (l = 1, \cdots, L) \text{ and}$$

$$(\sigma_l)^2 = \sum_{p=1}^{P} \sum_{ip=1}^{Ip} g_{ip/l}(\sigma_{ip})^2 \quad (l = 1, \cdots, L), \text{ respectively,}$$

and further on condition that a sum of $g_{ip/l}v_p r_{ip}$ for p=1, . . . , P and $i_p$=1, . . . , $I_p$ follows a normal distribution, wherein the determinate link accommodation constraint is represented by:

$\lambda d_l \ge \mu_l + t(\beta)\sigma_l$ (l=1, . . . , L)

where t(β) is a safety coefficient of a standard normal distribution satisfying β, and d-2) converting the stochastic node accommodation constraint to a determinate node accommodation constraint on condition that a sum of $o_{p/n}v_p$ for p=1, . . . , P follows a normal distribution having a mean $\mu_n$ and a variance $\sigma_n$, wherein the mean $\mu_n$ and the variance $\sigma_n$ are represented by:

$$\mu_n = \sum_{p=1}^{P} o_{p/n}\mu_p \quad (n = 1, \cdots, N) \text{ and}$$

$$(\sigma_n)^2 = \sum_{p=1}^{P} o_{p/n}(\sigma_p)^2 \quad (n = 1, \cdots, N), \text{ respectively,}$$

and the determinate node accommodation constraint is represented by:

$$ve_n - \sum_{l=1}^{L} h_{l/n}d_l \ge \mu_n + t(\gamma)\sigma_n \quad (n = 1, \cdots, N),$$

where t(γ) is a safety coefficient of a standard normal distribution satisfying γ.

15. The method according to claim 14, wherein the equivalent determinate programming problem consists of:

the objective function represented by:

$$\sum_{l=1}^{L} \omega_l d_l + \varepsilon \sum_{n=1}^{N} e_n$$

where $\omega_l$ is a cost coefficient of a link l and ε is a cost coefficient of a node, and the determinate constraints consisting of: the path accommodation constraint represented by:

$$\sum_{ip=1}^{Ip} c_{ip} \ge v_p \quad (p = 1, \cdots, P),$$

the determinate link accommodation constraint represented by:

$\lambda d_l \ge \mu_l + t(\beta)\sigma_l$ (l=1, . . . , L)

and the determinate node accommodation constraint represented by:

$$ve_n - \sum_{l=1}^{L} h_{l/n}d_l \ge \mu_n + t(\gamma)\sigma_n \quad (n = 1, \cdots, N).$$

16. The method according to claim 2, wherein, in the step c-1), the stochastic path accommodation constraint causes a probability that a total of capacities assigned to path candidates of a demand in a network state is not smaller than the requested capacity of the demand to be at least a predetermined path accommodation probability, wherein the network state indicates one of a normal state and fault states for some link, in the step c-2), the link accommodation constraint causes a total of capacities of path candidates passing through a link in the network state to be accommodated in the link, and in the step c-3), the stochastic node accommodation constraint causes a probability that a capacity assigned to a node exceeds a total of termination capacity of a link and termination capacity of the demand to be at least a predetermined node accommodation probability.

17. The method according to claim 16, wherein the stochastic path accommodation constraint generated in the step c-1) is represented by:

$$\text{Prob}\left[\sum_{i_p=1}^{I_p} c_{ip\varepsilon} \geq v_p\right] \geq \alpha \quad (p = 1, \cdots, P, \text{ and } s = 0, \cdots, S),$$

where

Prob [ ] represents a probability that the condition in [ ] is satisfied, p is a demand number, $i_p$ is a candidate number of a demand p in the range of $1, \ldots, I_p$, where a path candidate $i_p$ of a demand p is an arbitrary path between an originating node and a terminating node of a demand p, s is a network state in the range of $0, \ldots, S$, where 0 represents a normal state where no fault occurs, and each of $1, \ldots, S$ represents a fault state in which there is a fault on some link, $c_{ip\varepsilon}$: a capacity (integer variable) assigned to a path $i_p$ of a demand p in a state s, $v_p$ is a requested capacity (random variable) of a demand p, and $\alpha$ is a probability (path accommodation probability) that the requested capacity $v_p$ of a demand p is assigned to path candidates of the demand p:

the link accommodation constraint generated by the step c-2) is represented by:

$$\sum_{p=1}^{P}\sum_{i_p=1}^{I_p} g_{ip/1} c_{ip\varepsilon} \leq \lambda d_1 \quad (l = 1, \cdots, L, \text{ and } s = 0, \cdots, S)$$

$(l=1, \ldots, L, \text{ and } s=0, \ldots, S)$ where l: a link number, $g_{ip/l}$ is an indicator indicating 1 when a path candidate $i_p$ of a demand p passes through a link l (as represented by ip/l) and indicating 0 otherwise, $d_l$ is a capacity (integer variable) assigned to a link l, and $\lambda$ is a capacity of a link, and the stochastic node accommodation constraint generated by the step c-3) is represented by:

$$\text{Prob}\left[\sum_{l=1}^{L} h_{l/1} d_1 + \sum_{p=1}^{P} o_{p/n} v_p / \lambda \leq v e_n\right] \geq \gamma \quad (n = 1, \cdots, N)$$

where n is a node number, $h_{l/n}$ is an indicator indicating 1 when a link l passes though node n (as represented by l/n) and indicating 0 otherwise, $o_{p/n}$ is an indicator indicating 1 when a demand p terminates at a node n (as represented by p/n) and indicating 0 otherwise, 84 is a capacity of a node, $e_n$ is a capacity (integer variable) assigned to a node n, and $\gamma$ is a probability (node accommodation probability) that the total of capacities of links terminating at a node n and capacities of paths $i_p$ terminating at the node n can be accommodated in the node n.

18. The method according to claim 17, wherein the step d) comprises the steps of:

d-1) converting the stochastic path accommodation constraint to a determinate path accommodation constraint on condition that the requested capacity of the demand follows a normal distribution having a mean $\mu_p$ and a variance $\sigma_p$, wherein the determinate path accommodation constraint is represented by:

$$\sum_{i_p=1}^{I_p} c_{ip\varepsilon} \geq \mu_p + t(\alpha)\sigma_p \quad (p = 1, \cdots, P, s = 0, \cdots, S)$$

where $t(\alpha)$ is a safety coefficient of a standard normal distribution satisfying $\alpha$; and d-2) converting the stochastic node accommodation constraint to a determinate node accommodation constraint on condition that a sum of $o_{p/n}v_p$ for $p=1, \ldots, P$ follows a normal distribution having a mean $\mu_n$ and a variance $\sigma_n$, wherein the mean $\mu_n$ and the variance $\sigma_n$ are represented by:

$$\mu_n = \sum_{p=1}^{P} o_{p/n}\mu_p \quad (n = 1, \cdots, N) \text{ and}$$

$$(\sigma_n)^2 = \sum_{p=1}^{P} o_{p/n}(\sigma_p)^2 \quad (n = 1, \cdots, N), \text{ respectively,}$$

and the determinate node accommodation constraint is represented by:

$$v e_n - \sum_{l=1}^{L} h_{l/n} d_1 \geq \mu_n + t(\gamma)\sigma_n \quad (n = 1, \cdots, N),$$

$(n=1, \ldots, N),$ where $t(\gamma)$ is a safety coefficient of a standard normal distribution satisfying $\gamma$.

19. The method according to claim 18, wherein the equivalent determinate programming problem consists of:

the objective function represented by:

$$\sum_{l=1}^{L} \omega_l d_1 + \varepsilon \sum_{n=1}^{N} e_n$$

where $\omega_l$ is a cost coefficient of a link l and $\epsilon$ is a cost coefficient of a node, and the determinate constraints consisting of:

the determinate path accommodation constraint represented by:

$$\sum_{i_p=1}^{I_p} c_{ipe} \geq \mu_p + t(\alpha)\sigma_p \quad (p = 1, \cdots, P, s = 0, \cdots, S),$$

the link accommodation constraint represented by:

$$\sum_{p=1}^{P} \sum_{i_p=1}^{I_p} g_{ip/l} c_{ip} \le \lambda d_l \quad (l=1, \cdots, L, \text{ and } s=0, \cdots, S), \text{ and}$$

the determinate node accommodation constraint represented by:

$$ve_n = \sum_{l=1}^{L} h_{l/n} d_l \ge \mu_n + t(\gamma)\sigma_n \quad (n=1, \cdots, N).$$

20. The method according to claim 7, wherein,
in the step c-1), the path accommodation constraint causes a total of ratios of capacities assigned to path candidates of a demand to be at least 1 when it is assumed that the requested capacity of the demand is 1,
in the step c-2), the stochastic link accommodation constraint causes a probability that a capacity of a link exceeds the total of capacities of path candidates passing through the link in a network state to be at least a predetermined link accommodation probability, wherein the network state indicates one of a normal state and fault states for some link, and
in the step c-3), the stochastic node accommodation constraint causes a probability that a node capacity exceeds a total of termination capacity of a link and termination capacity of the demand to be at least a predetermined node accommodation probability.

21. The method according to claim 20, wherein the path accommodation constraint generated in the step c-1) is represented by:

$$\sum_{i_p=1}^{I_p} r_{ip\varepsilon} \ge 1 \quad (p=1, \cdots, P)$$

where
p is a demand number,
$i_p$ is a candidate number of a demand p in the range of $1, \ldots, I_p$, where a path candidate $i_p$ of a demand p is an arbitrary path between an originating node and a terminating node of a demand p,
$r_{ips}$ is a ratio (real number variable) assigned to a path candidate $i_p$ when it is assumed that the requested capacity of a demand p is 1 in a state s, and
s is a network state in the range of $0, \ldots, S$, where 0 represents a normal state where no fault occurs, and each of $1, \ldots, S$ represents a fault state in which there is a fault on some link,
the stochastic link accommodation constraint generated by the step c-2) is represented by:

$$\text{Prob}\left[\sum_{p=1}^{P} \sum_{i_p=1}^{I_p} g_{ip/l} v_p r_{ip\varepsilon} \le f_{l/s} \lambda d_l\right] \ge \beta$$

$(l=1, \ldots, L, \text{ and } s=0, \ldots, S)$ where
Prob [ ] represents a probability that the condition in [ ] is satisfied, l is a link number,
$g_{ip/l}$ is an indicator indicating 1 when a path candidate $i_p$ of a demand p passes through a link l (as represented by ip/l) and indicating 0 otherwise,
$d_l$ is a capacity (integer variable) assigned to a link l,
$f_{l/\epsilon}$ is an indicator indicating 0 when a link l is faulty, and indicating 1 when the link l is normal, wherein in the normal state represented as s=0, $f_{l/\epsilon}=1$ in every link l.
$\lambda$ is a capacity of a link,
$v_p$ is a requested capacity (random variable) of a demand p, and
$\beta$: a probability (link accommodation probability) that the total of capacities of paths $i_p$ passing through a link l can be accommodated in the link l, and
the stochastic node accommodation constraint generated by the step c-3) is represented by:

$$\text{Prob}\left[\sum_{l=1}^{L} h_{l/n} d_l + \sum_{p=1}^{P} o_{p/n} v_p / \lambda \le v e_n\right] \ge \gamma \quad (n=1, \cdots, N)$$

$(n=1, \ldots, N)$ where
n is a node number,
$h_{l/n}$ is an indicator indicating 1 when a link l passes though node n (as represented by l/n) and indicating 0 otherwise,
$o_{p/n}$ is an indicator indicating 1 when a demand p terminates at a node n (as represented by p/n) and indicating 0 otherwise,
$v$ is a capacity of a node,
$e_n$ is a capacity (integer variable) assigned to a node n, and
$\gamma$ is a probability (node accommodation probability) that the total of capacities of links terminating at a node n and capacities of paths $i_p$ terminating at the node n can be accommodated in the node n.

22. The method according to claim 21, wherein the step d) comprises the steps of:
d-1) converting the stochastic link accommodation constraint to a determinate link accommodation constraint on condition that the requested capacity of the demand follows a normal distribution having a mean $\mu_p$ and a variance $\sigma_p$, and a sum of $g_{ip/l} v_p r_{ips}$ for $p=1, \ldots, P$, $i=1, \ldots, i_p$ follows probability distribution having a mean $\mu_l$ and a variance $\sigma_l$ that are represented by:

$$\mu_l = \sum_{p=1}^{P} \sum_{ip=1}^{I_p} g_{ip/l} r_{ip\varepsilon} \mu_p \quad (l=1, \cdots, L) \text{ and}$$

$$(\sigma_l)^2 = \sum_{p=1}^{P} \sum_{ip=1}^{I_p} g_{ip/l} (r_{ip\varepsilon})^2 (\sigma_p)^2 \quad (l=1, \cdots, L),$$

respectively, and further on condition that a sum of $g_{ip/l} v_p r_{ips}$ for $p=1, \ldots, P$, $i_p=1, \ldots, I_p$ follows a normal distribution, wherein the determinate link accommodation constraint is represented by:

$\lambda d_l \ge \mu_l + t(\beta)\sigma_l$ $(l=1, \ldots, L)$ where $t(\beta)$ is a safety coefficient of a standard normal distribution satisfying $\beta$, and d-2) converting the stochastic node accommodation constraint to a determinate node accommodation constraint on condition that a sum of $o_{p/n}v_p$ for p=1, ..., P follows a normal distribution having a mean $\mu_n$ and a variance $\sigma_n$, wherein the mean $\mu_n$ and the variance $\sigma_n$ are represented by:

$$\mu_n = \sum_{p=1}^{P} o_{p/n}\mu_p \quad (n = 1, \cdots, N) \text{ and}$$

$$(\sigma_n)^2 = \sum_{p=1}^{P} o_{p/n}(\sigma_p)^2 \quad (n = 1, \cdots, N), \text{ respectively,}$$

and the determinate node accommodation constraint is represented by:

$$ve_n - \sum_{l=1}^{L} h_{l/n}d_l \geq \mu_n + t(\gamma)\sigma_n \quad (n = 1, \cdots, N),$$

where $t(\gamma)$ is a safety coefficient of a standard normal distribution satisfying $\gamma$.

23. The method according to claim 22, wherein the equivalent determinate programming problem consists of:
the objective function represented by:

$$\sum_{l=1}^{L} \omega_l d_l + \varepsilon \sum_{n=1}^{N} e_n$$

where $\omega_l$ is a cost coefficient of a link l and $\epsilon$ is a cost coefficient of a node, and
the determinate constraints consisting of: the path accommodation constraint represented by:

$$\sum_{ip=1}^{Ip} r_{ips} \geq 1 \quad (p = 1, \cdots, P, \text{ and } s = 0, \cdots, S),$$

the determinate link accommodation constraint represented by:

$$\lambda d_l \geq \mu_l + t(\beta)\sigma_l \quad (l=1, \ldots, L),$$

and the determinate node accommodation constraint represented by:

$$ve_n - \sum_{l=1}^{L} h_{l/n}d_l \geq \mu_n + t(\gamma)\sigma_n \quad (n = 1, \cdots, N).$$

24. The method according to claim 7, wherein,
in the step c-1), the path accommodation constraint causes a total of capacities assigned to path candidates of a demand in a network state to be at least the requested capacity of the demand, wherein indicates one of a normal state and fault states for some link,
in the step c-2), the stochastic link accommodation constraint causes a probability that a capacity of a link exceeds a total of capacities of paths passing through the link in the network state to be at least a predetermined link accommodation probability, and
in the step c-3), the stochastic node accommodation constraint causes a probability that a node capacity exceeds a total of termination capacity of a link and termination capacity of the demand to be at least a predetermined node accommodation probability.

25. The method according to claim 24, wherein the path accommodation constraint generated in the step c-1) is represented by:

$$\sum_{ip=1}^{Ip} c_{ips} \geq v_p \quad (p = 1, \cdots, P).$$

where
p is a demand number,
$i_p$ is a candidate number of a demand p in the range of 1, ..., $I_p$, where a path candidate $i_p$ of a demand p is an arbitrary path between an originating node and a terminating node of a demand p,
s is a network state in the range of 0, ..., S, where 0 represents a normal state where no fault occurs, and each of 1, ..., S represents a fault state in which there is a fault on some link,
$c_{ips}$: a capacity (integer variable) assigned to a path $i_p$ of a demand p in a state s, and
$v_p$ is a requested capacity (random variable) of a demand
the stochastic link accommodation constraint generated by the step c-2) is represented by:

$$\text{Prob}\left[\sum_{p=1}^{P}\sum_{ip=1}^{Ip} g_{ip/l}c_{ips} \leq f_{l/s}\lambda d_l\right] \geq \beta$$

$(l = 1, \cdots, L, \text{ and } s = 0, \cdots, S)$ $(l=1, \ldots, L, \text{ and } s=0, \ldots, S)$ where
Prob [ ] represents a probability that the condition in [ ] is satisfied,
l: a link number,
$g_{ip/l}$ is an indicator indicating 1 when a path candidate $i_p$ of a demand p passes through a link l (as represented by ip/l) and indicating 0 otherwise,
$d_l$ is a capacity (integer variable) assigned to a link l,
$f_{l/s}$ is an indicator indicating 0 when a link l is faulty, and indicating 1 when the link l is normal, wherein in the normal state represented as s=0, $f_{l/s}$=1 in every link l,
$\lambda$ is a capacity of a link,
$\beta$: a probability (link accommodation probability) that the total of capacities of paths $i_p$ passing through a link l can be accommodated in the link l, and
the stochastic node accommodation constraint a generated by the step c-3) is represented by:

$$\text{Prob}\left[\sum_{l=1}^{L} h_{l/n}d_l + \sum_{p=1}^{P} o_{p/n}v_p/\lambda \leq ve_n\right] \geq \gamma \quad (n = 1, \cdots, N)$$

where
n is a node number,
$h_{l/n}$ is an indicator indicating 1 when a link l passes though node n (as represented by l/n) and indicating 0 otherwise,
$o_{p/n}$ is an indicator indicating 1 when a demand p terminates at a node n (as represented by p/n) and indicating 0 otherwise, v is a capacity of a node,
$e_n$ is a capacity (integer variable) assigned to a node n, and
γ is a probability (node accommodation probability) that the total of capacities of links terminating at a node n and capacities of paths $i_p$ terminating at the node n can be accommodated in the node n.

26. The method according to claim 25, wherein the step d) comprises the steps of:

d-1) converting the stochastic link accommodation constraint to a determinate link accommodation constraint on condition that the requested capacity of the demand follows a normal distribution having a mean $\mu_p$ and a variance $\sigma_p$, wherein a mean $\mu_{ipa}$ and a variance a $\sigma_{ipε}$ of a random variable $c_{ips}$ is represented by:

$$\sum_{ip=1}^{Ip} \mu_{ipε} = \mu_p \quad (p=1,\cdots,P \text{ and } s=0,\cdots,S)$$

and $$\sum_{ip=1}^{Ip} (\sigma_{ipε})^2 = (\sigma_p)^2 \quad (p=1,\cdots,P \text{ and } s=0,\cdots,S),$$

respectively, and a sum of $g_{ip/l}c_{ips}$ for p=1, ..., P and $i_p=1, \ldots, I_p$ follows a probability distribution having a mean $\mu_{ls}$ and a variance $\sigma_{lε}$ that are represented by:

$$\mu_{1c} = \sum_{p=1}^{P} \sum_{ip=1}^{Ip} g_{ip/1}\mu_{ipε} \quad (l=1,\cdots,L \text{ and } s=0,\cdots,S)$$

and $$(\sigma_1)^2 = \sum_{p=1}^{P} \sum_{ip=1}^{Ip} (g_{ip/1}(\sigma_{ipε}))^2$$

(l=1, ..., L and s=0, ..., S), respectively, and further on condition that a sum of $g_{ip/l}c_{ips}$ for p=1, ..., P and $i_p=1, \ldots, I_p$ follows a normal distribution, wherein the determinate link accommodation constraint is represented by:

$$\lambda f_{lε} \geq \mu_{ls} + t(\beta)\sigma_{ls} \quad (l=1,\ldots,L \text{ and } s=0,\ldots,S)$$

where t(β) is a safety coefficient of a standard normal distribution satisfying β, and d-2) converting the stochastic node accommodation constraint to a determinate node accommodation constraint on condition that a sum of $o_{p/n}v_p$ for p=1, ..., P follows a normal distribution having a mean $\mu_n$ and a variance $\sigma_n$, wherein the mean $\mu_n$ and the variance $\sigma_n$ are represented by:

$$\mu_n = \sum_{p=1}^{P} o_{p/n}\mu_p \quad (n=1,\cdots,N) \text{ and}$$

$$(\sigma_1)^2 = \sum_{p=1}^{P} o_{p/n}(\sigma_p)^2 \quad (n=1,\cdots,N), \text{ respectively,}$$

and the determinate node accommodation constraint is represented by:

$$ve_n - \sum_{l=1}^{L} h_{l/n}d_1 \geq \mu_n + t(\gamma)\sigma_n \quad (n=1,\cdots,N),$$

(n=1, ..., N)

where t(γ) is a safety coefficient of a standard normal distribution satisfying γ.

27. The method according to claim 26, wherein the equivalent determinate programming problem consists of:

the objective function represented by:

$$\sum_{l=1}^{L} \omega_l d_1 + \varepsilon \sum_{n=1}^{N} e_n$$

where $\omega_l$ is a cost coefficient of a link l and ε is a cost coefficient of a node, and the determinate constraints consisting of: the path accommodation constraint represented by:

$$\sum_{ip=1}^{Ip} c_{ips} \geq v_p \quad (p=1,\cdots,P \text{ and } s=0,\cdots,S),$$

the determinate link accommodation constraint represented by:

$$\lambda f_{lε} \geq \mu_{ls} + t(\beta)\sigma_{ls} \quad (l=1,\ldots,L \text{ and } s=0,\ldots,S)$$

and the determinate node accommodation constraint represented by:

$$ve_n - \sum_{l=1}^{L} h_{l/n}d_1 \geq \mu_n + t(\gamma)\sigma_n \quad (n=1,\cdots,N).$$

28. A system for designing a communication network composed of a plurality of nodes and links each connecting two nodes, comprising:

an input means for inputting network data including a requested capacity of a demand as a random variable following a predetermined probability distribution between any two nodes and path candidates of the demand for accommodating the requested capacity of the demand;

a first generator for generating an objective function representing a total cost of the nodes and the links from the network data;

a second generator for generating a predetermined set of stochastic constraints by using the requested capacity of the demand to produce a stochastic programming problem including the objective function and the stochastic constraints;

a converter for converting the stochastic programming problem into an equivalent determinate programming problem on condition of the predetermined probability distribution; and an optimizing means for solving the determinate programming problem to determine capacities of the nodes and the links so that the objective function is minimized.

29. The system according to claim 28, wherein the second generator generates a stochastic path accommodation constraint for causing the requested capacity of the demand to be accommodated in the path candidates, generates a link accommodation constraint for causing capacities assigned to path candidates to be accommodated in the links, and generates a stochastic node accommodation constraint for causing a total of capacities of path candidates passing through a node to be accommodated in the node.

30. The system according to claim 29, wherein the stochastic path accommodation constraint causes a probability that a total of capacities assigned to path candidates of a demand is not smaller than the requested capacity of the demand to be at least a predetermined path accommodation probability, the link accommodation constraint causes a total of capacities of path candidates passing through a link to be accommodated in the link, and the stochastic node accommodation constraint causes a probability that a capacity assigned to a node exceeds a total of termination capacity of a link and termination capacity of the demand to be at least a predetermined node accommodation probability.

31. The system according to claim 28, wherein the second generator generates a path accommodation constraint for causing the requested capacity of the demand to be accommodated in the path candidates, generates a stochastic link accommodation constraint for causing capacities assigned to path candidates to be accommodated in the links, and generates a stochastic node accommodation constraint for causing a total of capacities of path candidates passing through a node to be accommodated in the node.

32. The system according to claim 31, wherein, the path accommodation constraint causes a total of ratios of capacities assigned to path candidates of a demand to be at least 1 when it is assumed that the requested capacity of the demand is 1, the stochastic link accommodation constraint causes a probability that a capacity of a link exceeds the total of capacities of path candidates passing through the link to be at least a predetermined link accommodation probability, and the stochastic node accommodation constraint causes a probability that a node capacity exceeds a total of termination capacity of a link and termination capacity of the demand to be at least a predetermined node accommodation probability.

33. The system according to claim 31, wherein, the path accommodation constraint causes a total of capacities assigned to path candidates of a demand to be at least the requested capacity of the demand, the stochastic link accommodation constraint causes a probability that a capacity of a link exceeds a total of capacities of paths passing through the link to be at least a predetermined link accommodation probability, and the stochastic node accommodation constraint causes a probability that a node capacity exceeds a total of termination capacity of a link and termination capacity of the demand to be at least a predetermined node accommodation probability.

34. The system according to claim 29, wherein, the stochastic path accommodation constraint causes a probability that a total of capacities assigned to path candidates of a demand in a network state is not smaller than the requested capacity of the demand to be at least a predetermined path accommodation probability, wherein the network state indicates one of a normal state and fault states for some link, the link accommodation constraint causes a total of capacities of path candidates passing through a link in the network state to be accommodated in the link, and the stochastic node accommodation constraint causes a probability that a capacity assigned to a node exceeds a total of termination capacity of a link and termination capacity of the demand to be at least a predetermined node accommodation probability.

35. The system according to claim 31, wherein, the path accommodation constraint causes a total of ratios of capacities assigned to path candidates of a demand to be at least 1 when it is assumed that the requested capacity of the demand is 1, the stochastic link accommodation constraint causes a probability that a capacity of a link exceeds the total of capacities of path candidates passing through the link in a network state to be at least a predetermined link accommodation probability, wherein the network state indicates one of a normal state and fault states for some link, and the stochastic node accommodation constraint causes a probability that a node capacity exceeds a total of termination capacity of a link and termination capacity of the demand to be at least a predetermined node accommodation probability.

36. The system according to claim 31, wherein, the path accommodation constraint causes a total of capacities assigned to path candidates of a demand in a network state to be at least the requested capacity of the demand, wherein indicates one of a normal state and fault states for some link, the stochastic link accommodation constraint causes a probability that a capacity of a link exceeds a total of capacities of paths passing through the link in the network state to be at least a predetermined link accommodation probability, and the stochastic node accommodation constraint causes a probability that a node capacity exceeds a total of termination capacity of a link and termination capacity of the demand to be at least a predetermined node accommodation probability.

37. A recording medium storing a network designing control program which causes a computer to designing a communication network composed of a plurality of nodes and links each connecting two nodes, the network designing control program comprising the steps of:

a) inputting network data including a requested capacity of a demand as a random variable following a predetermined probability distribution between any two nodes and path candidates of the demand for accommodating the requested capacity of the demand;

b) generating an objective function representing a total cost of the nodes and the links from the network data;

c) generating a predetermined set of stochastic constraints by using the requested capacity of the demand to produce a stochastic programming problem including the objective function and the stochastic constraints;

d) converting the stochastic programming problem into an equivalent determinate programming problem on condition of the predetermined probability distribution; and e) solving the determinate programming problem to determine capacities of the nodes and the links so that the objective function is minimized.

38. The recording medium according to claim 37, wherein the step c) comprises the steps of:

generating a stochastic path accommodation constraint for causing the requested capacity of the demand to be accommodated in the path candidates;

generating a link accommodation constraint for causing capacities assigned to path candidates to be accommodated in the links; and generating a stochastic node accommodation constraint for causing a total of capacities of path candidates passing through a node to be accommodated in the node.

39. The recording medium according to claim 38, wherein the stochastic path accommodation constraint causes a probability that a total of capacities assigned to path candidates of a demand is not smaller than the requested capacity of the demand to be at least a predetermined path accommodation probability, the link accommodation constraint causes a total of capacities of path candidates passing through a link to be accommodated in the link, and the stochastic node accommodation constraint causes a probability that a capacity assigned to a node exceeds a total of termination capacity of a link and termination capacity of the demand to be at least a predetermined node accommodation probability.

40. The recording medium according to claim 37, wherein the step c) comprises the steps of:

generating a path accommodation constraint for causing the requested capacity of the demand to be accommodated in the path candidates;

generating a stochastic link accommodation constraint for causing capacities assigned to path candidates to be accommodated in the links; and generating a stochastic node accommodation constraint for causing a total of capacities of path candidates passing through a node to be accommodated in the node.

41. The recording medium according to claim 40, wherein, the path accommodation constraint causes a total of ratios of capacities assigned to path candidates of a demand to be at least 1 when it is assumed that the requested capacity of the demand is 1, the stochastic link accommodation constraint causes a probability that a capacity of a link exceeds the total of capacities of path candidates passing through the link to be at least a predetermined link accommodation probability, and the stochastic node accommodation constraint causes a probability that a node capacity exceeds a total of termination capacity of a link and termination capacity of the demand to be at least a predetermined node accommodation probability.

42. The recording medium according to claim 40, wherein, the path accommodation constraint causes a total of capacities assigned to path candidates of a demand to be at least the requested capacity of the demand, the stochastic link accommodation constraint causes a probability that a capacity of a link exceeds a total of capacities of paths passing through the link to be at least a predetermined link accommodation probability, and the stochastic node accommodation constraint causes a probability that a node capacity exceeds a total of termination capacity of a link and termination capacity of the demand to be at least a predetermined node accommodation probability.

43. The recording medium according to claim 38, wherein, the stochastic path accommodation constraint causes a probability that a total of capacities assigned to path candidates of a demand in a network state is not smaller than the requested capacity of the demand to be at least a predetermined path accommodation probability, wherein the network state indicates one of a normal state and fault states for some link, the link accommodation constraint causes a total of capacities of path candidates passing through a link in the network state to be accommodated in the link, and the stochastic node accommodation constraint causes a probability that a capacity assigned to a node exceeds a total of termination capacity of a link and termination capacity of the demand to be at least a predetermined node accommodation probability.

44. The recording medium according to claim 40, wherein, the path accommodation constraint causes a total of ratios of capacities assigned to path candidates of a demand to be at least 1 when it is assumed that the requested capacity of the demand is 1, the stochastic link accommodation constraint causes a probability that a capacity of a link exceeds the total of capacities of path candidates passing through the link in a network state to be at least a predetermined link accommodation probability, wherein the network state indicates one of a normal state and fault states for some link, and the stochastic node accommodation constraint causes a probability that a node capacity exceeds a total of termination capacity of a link and termination capacity of the demand to be at least a predetermined node accommodation probability.

45. The recording medium according to claim 40, wherein, the path accommodation constraint causes a total of capacities assigned to path candidates of a demand in a network state to be at least the requested capacity of the demand, wherein indicates one of a normal state and fault states for some link, the stochastic link accommodation constraint causes a probability that a capacity of a link exceeds a total of capacities of paths passing through the link in the network state to be at least a predetermined link accommodation probability, and the stochastic node accommodation constraint causes a probability that a node capacity exceeds a total of termination capacity of a link and termination capacity of the demand to be at least a predetermined node accommodation probability.

* * * * *

UNITED STATES PATENT AND TRADEMARK OFFICE
CERTIFICATE OF CORRECTION

PATENT NO. : 6,404,744 B1
DATED : June 11, 2002
INVENTOR(S) : Hiroyuki Saito

It is certified that error appears in the above-identified patent and that said Letters Patent is hereby corrected as shown below:

<u>Title page,</u>
Item [22], insert the following:

-- [30] Foreign Application Priority Data

Jan. 22, 1998    [JP]    Japan ....10/009982 --

Signed and Sealed this

Twenty-ninth Day of October, 2002

*Attest:*

*Attesting Officer*

JAMES E. ROGAN
*Director of the United States Patent and Trademark Office*